United States Patent
Kagemoto et al.

(10) Patent No.: US 6,584,069 B1
(45) Date of Patent: Jun. 24, 2003

(54) PACKET FILTERING APPARATUS THAT APPLIES A PLURALITY OF FILTERING CONDITIONS INCLUDING DIFFERENT COMPARISON CRITERIA TO A SINGLE PACKET

(75) Inventors: Hideki Kagemoto, Nara (JP); Takashi Kakiuchi, Toyonaka (JP); Naoya Takao, Kadoma (JP); Kazuo Okamura, Hirataka (JP)

(73) Assignee: Matsushita Electric Industrial Co., LTD, Osaka-fu (JP)

( * ) Notice: Subject to any disclaimer, the term of this patent is extended or adjusted under 35 U.S.C. 154(b) by 0 days.

(21) Appl. No.: 09/386,071

(22) Filed: Aug. 30, 1999

(30) Foreign Application Priority Data

Aug. 31, 1998 (JP) ............................................. 10-245729

(51) Int. Cl.⁷ ......................... H04L 12/26; H04L 12/54
(52) U.S. Cl. ....................................... 370/230; 370/429
(58) Field of Search ................................ 370/230, 358, 370/389, 394, 392; 714/819, 820, 821, 822, 823, 824; 348/390.1; 375/240.12, 240.29

(56) References Cited

U.S. PATENT DOCUMENTS

| | | | | |
|---|---|---|---|---|
| 5,369,634 A | * | 11/1994 | Denissen | |
| 5,990,955 A | * | 11/1999 | Koz | |
| 6,014,368 A | * | 1/2000 | Sanami | |
| 6,047,028 A | * | 4/2000 | Van Ackere | |
| 6,104,757 A | * | 8/2000 | Rhee | |
| 6,212,184 B1 | * | 4/2001 | Venkatachary | |
| 6,222,841 B1 | * | 4/2001 | Taniguchi | |
| 6,226,291 B1 | * | 5/2001 | Chauvel | |
| 6,449,256 B1 | * | 9/2002 | Varghese | |

FOREIGN PATENT DOCUMENTS

| | | |
|---|---|---|
| JP | 9-182049 | 7/1907 |
| JP | 63111787 | 5/1988 |
| JP | 9-270813 | 10/1997 |
| WO | WO98/09437 | 3/1998 |

* cited by examiner

Primary Examiner—Kwang Bin Yao
Assistant Examiner—Kamran Emdadi

(57) ABSTRACT

A packet filtering apparatus selectively outputs packets among a plurality of inputted packets. A plurality of conditions are stored, with each condition being specified by a partial data position that indicates a position of a data part of a packet, comparison data to which the data part is to be compared, and a comparison criterion for comparing the data part and comparison data. Different conditions contain different comparison criteria. When filtering packets, a condition in one of the stored conditions is selected, and a data part of an inputted packet is compared with the comparison data of the selected condition according to the comparison criterion in the selected condition. Packets are selectively outputted depending on the result of the comparison.

17 Claims, 21 Drawing Sheets

FIG. 2

| FILTERING CONDITION NUMBER | COMPARISON DATA POSITION | COMPARISON DATA |
|---|---|---|
| 1 | 00000000000000FF | 0000000000000080 |
| 2 | 000000FFFF000000 | 000000AB22000000 |

FIG. 5

| COMPARISON DATA POSITION | COMPARISON DATA |
|---|---|
| | ⋮ |
| | 0000050000000000 |
| | 0000060000000000 |
| 0000FF0000000000 | 0000070000000000 |
| | 0000080000000000 |
| | ⋮ |

FIG. 11

| FILTERING CONDITION NUMBER | COMPARISON DATA POSITION | COMPARISON DATA | METHOD OF COMPARISON |
|---|---|---|---|
| 1 | FFFF000000000000 | 1A45000000000000 | 0 (COMPARED VALUES ARE EQUAL) |
| 2 | 000000FF00000000 | 000000AC00000000 | 1 (COMPARED VALUES ARE NOT EQUAL) |

FIG. 14

| COMPARISON DATA POSITION | COMPARISON DATA | METHOD OF COMPARISON |
|---|---|---|
| | ⋮ | ⋮ |
| 0000FF0000000000 | 0000050000000000 | 0 |
| | 0000040000000000 | 1 |
| | 0000060000000000 | 0 |
| | 0000050000000000 | 1 |
| | ⋮ | ⋮ |

FIG. 19

| FILTERING CONDITION NUMBER | CONDITION GROUP 1 | | | CONDITION GROUP 2 | | | STORAGE ADDRESS |
|---|---|---|---|---|---|---|---|
| | COMPARISON DATA POSITION 1 | COMPARISON DATA 1 | METHOD OF COMPARISON 1 | COMPARISON DATA POSITION 2 | COMPARISON DATA 2 | METHOD OF COMPARISON 2 | |
| 1 | F0000000 | 30000000 | 1 | 00FF0000 | 00E30000 | 2 | 00001C00 |
| 2 | F0000000 | 40000000 | 1 | 0000FF00 | 00005600 | 5 | 00002400 |

FIG. 20

| METHOD OF COMPARISON | CONDITION |
|---|---|
| 1 | LOGICAL AND OF FIRST FOUR BYTES OF PACKET AND COMPARISON DATA POSITION IS EQUAL TO COMPARISON DATA |
| 2 | LOGICAL AND OF FIRST FOUR BYTES OF PACKET AND COMPARISON DATA POSITION IS SMALLER THAN COMPARISON DATA |
| 3 | LOGICAL AND OF FIRST FOUR BYTES OF PACKET AND COMPARISON DATA POSITION IS EQUAL TO OR SMALLER THAN COMPARISON DATA |
| 4 | LOGICAL AND OF FIRST FOUR BYTES OF PACKET AND COMPARISON DATA POSITION IS GREATER THAN COMPARISON DATA |
| 5 | LOGICAL AND OF FIRST FOUR BYTES OF PACKET AND COMPARISON DATA POSITION IS EQUAL TO OR GREATER THAN COMPARISON DATA |
| 6 | LOGICAL AND OF FIRST FOUR BYTES OF PACKET AND COMPARISON DATA POSITION IS NOT EQUAL TO COMPARISON DATA |
| 7 | ALWAYS SATISFIED |

FIG. 21

PACKET 3001 | 42 C0 58 F3 · · ·

PACKET FILTERING APPARATUS THAT APPLIES A PLURALITY OF FILTERING CONDITIONS INCLUDING DIFFERENT COMPARISON CRITERIA TO A SINGLE PACKET

This application is based on an application No. H10-245729 filed in Japan, the content of which is hereby incorporated by reference.

BACKGROUND OF THE INVENTION (1) Field of the Invention

The present invention applies to a packet filtering apparatus that filters packets In particular, the invention relates to an apparatus, such as that used by a set-top box (hereafter, STB) for receiving a broadcast, that extracts required packets from a plurality of packets that are transferred as a broadcast.

(2) Prior Art

Several techniques for transferring video and audio information as digital information have been developed. Such techniques can be used in broadcasting and other fields, and transfer such digital information as packets that are obtained by dividing the digital information into units of a suitable length and adding information required for transfer. A packet is therefore a processing unit that is indicated to both the transmitter and receiver in advance. The information required for transfer includes the type, size, and transfer destination of each packet. In many cases, such information forms the first part of each packet, and so is called the header information.

The transferred packets are received by a reproduction apparatus (such as an STS that receives a broadcast or a personal computer connected to the Internet) that uses the information in them to reproduce video and audio. In order to extract the video and audio from the packets, the reproduction apparatus first has to select only the required packets out of the various packets it receives. This processing for selecting the right packets can be achieved exclusively by software that is executed by the CPU in the reproduction apparatus. However, to reduce the processing load of the CPU, this packet selecting will generally be executed by specialized packet selecting hardware (hereafter, a filtering apparatus) that is independent of the CPU.

In digital broadcasts (and digital communication in general), a field denoting a version number showing the position of a packet in the order of packets is given at a specified position in header information. For certain kinds of packets (such as those including information for a list of broadcast programs), the same information is broadcast consecutively and cyclically to guarantee that the reproduction apparatus will be able to immediately obtain the latest information, even if the reproduction apparatus has been switched on midway through a broadcast.

In general, a packet with the same content as a preceding packet with the same packet type will be given the same version number. Conversely, a packet with the same packet type but a content that follows the preceding packet will be given a version number that is one greater than that of the preceding packet. Such version number is reset to zero on exceeding a maximum value.

A conventional filtering apparatus that is provided in a reproduction apparatus passes (i.e., selects) packets that are consecutively transmitted according to a filter condition whereby the version number has to match a specific value. When version numbers are used for packets, the filtering apparatus will only select a packet of a specified type if the version number of the packet follows the version number of the previously received packet of that type. The selected packet is then used by the reproduction apparatus in the processing it performs thereafter.

The following is a detailed description of the selection of packets by a conventional filtering apparatus in detail, with reference to FIGS. 1 to 6.

FIG. 1 is a block diagram showing the construction of a conventional filtering apparatus 131. FIG. 2 shows examples of the filtering conditions stored in the filtering condition storage unit 1314. Here, assume that the construction and operation of the reproduction apparatus that includes the filtering apparatus 131 are fundamentally the same as those of the STB 3 explained in the "Description of the Preferred Embodiments" with reference to FIGS. 8 and 9, etc.

As shown in FIG. 1, the conventional filtering apparatus 131 includes a packet obtaining unit 1311, a filtering unit 1312, a packet outputting unit 1313, a filtering condition storage unit 1314 and a filtering condition setting unit 1315.

The packet obtaining unit 1311 obtains a packet from a broadcasting center via a wired or wireless transfer path, and sends the packet to the filtering unit 1312. The filtering control unit indicates the filtering conditions to the filtering condition setting unit 1315, which then stores the indicated filtering conditions in the filtering condition storage unit 1314.

As shown in FIG. 2, each filtering condition stored in the filtering condition storage unit 1314 is composed of a filtering condition number for specifying the filtering condition, a comparison data position, and comparison data. The filtering condition number is composed of a one-byte integer, while the comparison data position and comparison data are each composed of an eight-byte integer. All these values are expressed in hexadecimal. Note that the comparison data position and comparison data are explained later in this text.

The filtering unit 1312 operates as follows. When a packet is received from the packet obtaining unit 1311, the filtering unit 1312 applies the filtering conditions stored in the filtering condition storage unit 1314, judges whether the obtained packet is necessary, and sends only the packets it has judged to be necessary to the packet outputting unit 1313. The packet outputting unit 1313 stores the packets transferred in this way into a buffer memory. This buffer memory has a plurality of areas, with packets being stored into different areas according to which filtering condition they satisfy. Video and audio reproduction then take place using the packets that have been stored into the buffer memory.

The following is a detailed description of the control procedure by which the above conventional filtering apparatus 131 performs filtering by judging whether the obtained packets are necessary.

FIG. 3 is a flowchart showing the control procedure for the filtering of packets by a conventional filtering apparatus 131 (shown in FIG. 1). FIG. 4 shows the actual packets that are obtained by the packet obtaining unit 1311.

In the example shown in FIG. 4, the packet obtaining unit 1311 obtains packets 501 to 509 one at a time in that order. In each packet, one-byte units of data are successively obtained in the order shown from left to right (1A, 3F, 05, AB . . . ) in FIG. 4.

The following describes the filtering by the filtering apparatus 131. First, a packet to be stored in the buffer memory is specified according to an indication from the filtering control unit. In accordance with this packet, filtering conditions, such as those shown in FIG. 2, are set by the filtering condition setting unit 1315 and are stored in the filtering condition storage unit 1314 (S201). After this, the packet obtaining unit 1311 obtains the next packet to arrive via the transfer path (S202), and one of the filtering conditions stored in the filtering condition storage unit 1314 is selected (S203).

Suppose here that the plurality of filtering conditions are applied one a time in order of the filtering condition numbers to packet 501 that has been obtained by the packet obtaining unit 1311, Tn such case, filtering condition#1 is selected, and it is judged whether packet 501 satisfies this filtering condition. After this, filtering condition#2 is selected as the next filtering condition and the judgement is performed again for packet 501.

A logical AND is taken for the comparison data position of the selected filtering condition and the first eight bytes of the packet obtained by the packet obtaining unit 1311, and the result is substituted into the variable x (S204). The comparison data is substituted into the variable y (S205).

In an actual example, the value 0000000000000090 is substituted into the variable x as a result of the logical AND taken for the comparison data position 00000000000000FF of filtering condition#1 and the data 1A3F05AB22C60090 of packet 501 obtained by the packet obtaining unit 1311. The comparison data 0000000000000080 is substituted into the variable y.

Next, it is judged whether the variables x and y are equal (S206). If so (S206:Yes), the packet that has been obtained by the packet obtaining unit 1311 is stored in the buffer memory via the packet outputting unit 1313 (S207). It is then judged whether all of the packets that were indicated by the filtering control unit have been stored in the buffer memory (S208). If so (S208:Yes), the present procedure ends (S208:Yes). If this is not the case (S208:No), the filtering conditions stored in the filtering condition storage unit 1314 are updated to new filtering conditions for the next packet to be stored in the buffer (S209).

If the variables x and y are not equal (S206:No), it is then judged whether all of the filtering conditions have been applied (S210). It not (S210:No), the processing returns to S203 where a different filtering condition (i.e., a filtering condition with a different filtering condition number) is selected, and the above procedure is repeated. If all of the filtering conditions have been applied (S210:Yes), a new packet is obtained in S202 and the above procedure is repeated.

When the values given above are substituted into the variables x and y, these variables will not be equal, so that packet 501 obtained by the packet obtaining unit 1311 will not satisfy filtering condition#1 and will not be stored in the buffer memory. For filtering condition#2, however, the variables x and y are both set at the value 000000AB22000000. Since the variables x and y are equal, packet 501 satisfies filtering condition#2, and so is stored in the buffer memory.

With the conventional filtering apparatus 131, the above processing is repeated for packets 501–509 in order to filter the transferred packets.

The following describes the filtering of packets by a conventional filtering apparatus 131 when one of the filtering conditions described above relates to the version number of a packet.

FIG. 5 shows filtering conditions relating to version numbers that can be stored in the filtering condition storage unit 1314 (see FIG. 1). In this example, it is assumed that packets 501–509, such as those shown in FIG. 4, are transferred in order, with packets 501–503 having the same content, as do packets 504–506 and packets 507–509. It is also assumed that the third byte from the start of a packet shows the version number of the packet. Note that while a variety of different arrangements are used for packets, filtering based on numbers that show the order of packets will still be possible using a similar kind of procedure.

The conventional filtering apparatus 131 operates according to the above control procedure. As a result, the comparison data position 0000FF0000000000 and the comparison data 0000050000000000 are stored in the filtering condition storage unit 1314 as the filtering condition, based on control by the filtering control unit (the processing in S201 of FIG. 3). This filtering condition shows that the third byte showing the version number is five. The packet obtaining unit 1311 obtains packet 501 (the processing in S202), and it is judged whether the data set in the filtering apparatus 131 is equal to data included in packet 501 (the processing in S206). Packet 501 satisfies the condition that the third byte showing the version number is five (corresponding to the result "Yes" in S206), so that packet 501 is stored via the packet outputting unit 1313 into the buffer memory (the processing in S207). Once packet 501 with the version number 5 has been obtained, the filtering condition stored in the filtering condition storage unit 1314 is updated according to control by the filtering control unit so that the comparison data position becomes 0000FF0000000000 and the comparison data becomes 0000060000000000 (the processing in S209). This updated filter condition requires that the third byte showing the version number is six.

As time passes, packet 502 and packet 503, which have the same content as packet 501, are transmitted to the reproduction apparatus and are obtained by the packet obtaining unit 1311. However, since packets 502 and 503 do not satisfy the above filter condition, these packets are not outputted toward the packet outputting unit 1313 and so are not stored in the buffer memory.

After packets 502 and 503, packet 504 with the version number six arrives at the reproduction apparatus and is obtained by the packet obtaining unit 1311. In accordance with the above control procedure of the filtering unit 1312, this packet 504 is outputted to the packet outputting unit 1313 and is stored in the buffer memory.

Control by the filtering control unit increments the version number to seven (i.e., the corresponding filtering condition is set), and the above processing is performed so that packets 505 and 506 that have the same content as packet 504 are not stored into the buffer memory, though the packet, packet 507, with the version number 7 that is obtained by the packet obtaining unit 1311 after these packets is stored into the buffer memory via packet outputting unit 1313.

FIG. 6 shows the filtering performed by a conventional filtering apparatus 131. When packets 501–509 include consecutive packets with the same content, the filtering condition will be properly updated according to the control shown in FIG. 3, so that packets 501, 504, and 507 are obtained in accordance with the version numbers and are outputted to the packet outputting unit 1313. This means that appropriate filtering is performed, with a plurality of packets with the same content not being stored into the buffer memory.

With this kind of filtering apparatus, however, a large number of packets may be lost even if there is only a minor disruption to the communication on the transfer path.

As described above, the filtering apparatus filters packets using a filtering condition whereby the version number is equal to a value given by adding one to the version number of the previously obtained packet of the same type. Note that once the highest version number has been assigned to packet(s), the version number is reset to zero, so that the version numbers are used cyclically.

Here, suppose there is a temporary disruption to the transfer path that prevents all packets with a version number that satisfies the filtering condition from being received. The version number assigned to packets is restored to zero after reaching its maximum value, which means that the packet with the version number that satisfies the next filtering condition will be a packet in a next cycle with this version number. All packets from the packets with a version number equal to a value produced by adding one to the version number of the packet that last satisfied the filtering condition to the packets with a version number that is one less than this value will not be processed, in spite of having changing contents that should be processed by the reproduction apparatus.

This is described in more detail below, with reference to FIG. 7 that shows the effects of a communication disruption on the filtering of packets by a conventional filtering apparatus 131. In this example, packets are properly received up to packet 503, with a communication disruption occurring on the transfer path immediately after packet 503 has been received. This disruption results in packets 504–506 failing to reach the reproduction apparatus.

On successfully receiving packet 501, the filtering apparatus 131 sets "version number=6" as the filtering condition. This means that none of the packets obtained by the packet obtaining unit 1311 (see FIG. 1) from packet 507 with the version number#7 onward will satisfy this filtering condition This will continue until the version number of the transferred packets reaches its maximum value (here, 255), returns to zero, and thereafter increases once again so that a packet with the version number#6 is received.

As described above, a temporary disruption to communication on a transfer path will prevent a conventional filtering apparatus from properly filtering for one whole cycle of packets. This means that a reproduction apparatus will not process packets during this time, so that the processing cannot proceed as normal. When the packets include video data, for example, this means that the reproduction of video images corresponding to such video data will be interrupted.

SUMMARY OF THE INVENTION

The present invention was conceived in view of the above problems with the conventional art, and has an object of providing a packet filtering apparatus that can flexibly and efficiently filter packets, while minimizing the effects of a failure of certain packets to arrive due to a disruption to the communication.

The stated object can be achieved by a packet filtering apparatus for selectively outputting packets out of a plurality of inputted packets. This packet filtering apparatus stores a plurality of conditions, each condition being specified by (1) a partial data position that indicates a position of a data part of a packet, (2) comparison data to which the data part is to be compared, and (3) a comparison criterion for comparing the data part and comparison data, with different conditions including different comparison criteria. One of the stored plurality of conditions is selected. Based on the selected condition, the data part of one inputted packet is compared with the comparison data according to the comparison criterion and the packet is allowed to pass depending on a comparison result.

With the stated construction, a plurality of (filtering) conditions including different comparison criteria are selectively applied to individual packets, so that the filtering of packets both flexible and efficient.

The packet filtering apparatus may update, when the inputted packet does not satisfy the selected condition, the selected condition to a different one of the stored plurality of conditions. Based on the updated condition, the packet filtering apparatus may then compare a data part of the inputted packet with the comparison data according to the comparison criterion and selectively allow the packet to pass depending on a comparison result for the updated condition.

With the stated construction, the selected condition is suitably updated to a condition including a different comparison criterion, so that the filtering of packets is both flexible and efficient.

Here packet filtering apparatus may also indicate which part of a predetermined memory should be used for storing data of a selectively passed packet, based on which condition was satisfied by the selectively passed packet.

With the stated construction, a plurality of conditions including different comparison criteria are selectively applied to individual packets, making the filtering of packets both flexible and efficient. The processing of the filtered data can be performed smoothly in accordance with the position in the memory into which the data of packets has been stored.

Here, the data part of a packet may show a position of the packet in an order assigned to the plurality of packets.

With the stated construction, the effects of a failure of certain packets to arrive due to a disruption to the communication are minimized, so that the filtering of packets is both flexible and efficient.

Here, at least one of the stored plurality of conditions may include a comparison criterion relating to whether the data part and the comparison data are not equal, and a packet may be allowed to pass if the data part and the comparison data are not equal. Also, at least one of the stored plurality of conditions may include a comparison criterion relating to relative magnitudes of the data part and the comparison data, and a packet may be allowed to pass if the data part of the packet and the comparison data satisfy the comparison criterion relating to the relative magnitudes.

Due to the use of the above comparison criteria, the filtering of packets is both flexible and efficient.

Here, the packet may either of an MPEG (Moving Pictures Experts Group) transport stream packet and an MPEG packetized elementary stream packet.

With the stated construction, flexible and efficient filtering can be performed for transport stream packets or packetized elementary stream packets.

The stated object can also be achieved by a packet filtering apparatus for selectively outputting packets out of a plurality of inputted packets. The packet filtering apparatus stores a plurality of type 2 conditions, each type 2 condition being composed of a plurality of type 1 conditions, each type 1 condition being specified by (1) a partial data position that indicates a position of a data part of a packet, (2) comparison data to which the data part is to be compared, and (3) a comparison criterion for comparing the data part and comparison data. The type 2 conditions are composed such that the comparison criteria in the type 1 conditions differ, either between the type 1 conditions in a same type 2 condition or between the type 1 conditions in different type 2 conditions. One type 2 condition is selected out of the stored plurality of type 2 conditions. By applying each type 1 condition in the selected type 2 condition one at a time, the data part of one inputted packet is compared with the comparison data according to the comparison criterion and the packet is selectively allowed to pass only if a comparison result "true" is given for every type 1 condition in the selected type 2 condition.

With the stated construction, a plurality of conditions are applied to packets and only packets that satisfy all of the conditions are passed. These makes the filtering of packets efficient and highly flexible.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows examples of the filtering conditions stored in the filtering condition storage unit 1314 shown in FIG. 1;

FIG. 5 shows filtering conditions relating to version numbers that can be stored in the filtering condition storage unit 1314;

FIG. 11 shows examples of the filtering conditions stored in the filtering condition storage unit 314 shown in FIG. 10;

FIG. 14 shows the filtering conditions stored in the filtering condition storage unit 314 that correspond to version numbers;

FIG. 19 shows examples of the filtering conditions stored in the filtering condition storage unit 414;

FIG. 20 shows examples of the meanings attached to the values used to indicate the method of comparison; and FIG. 21 shows examples of the packets that are transferred.

DESCRIPTION OF THE PREFERRED EMBODIMENTS

Figure 8:
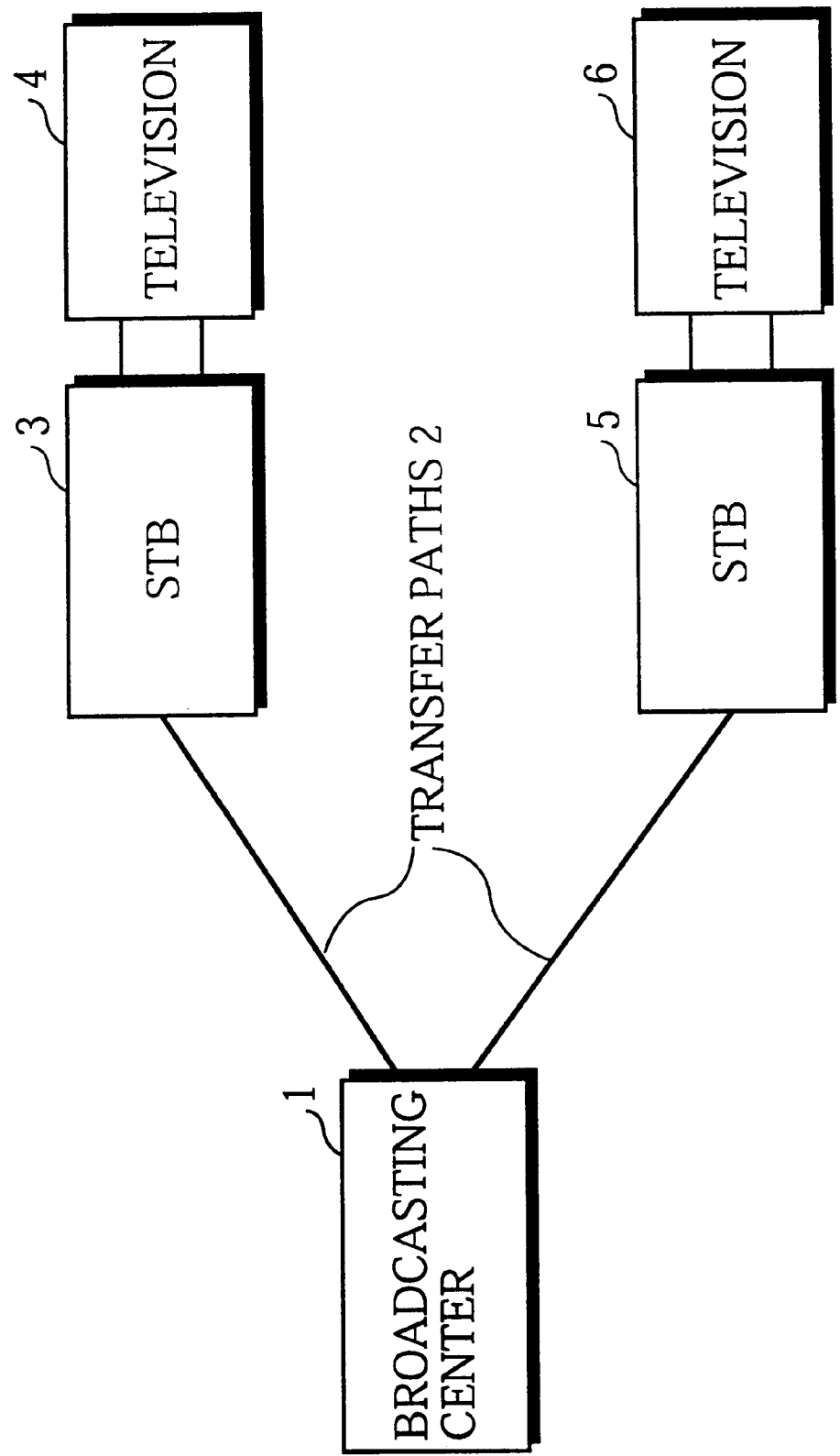
FIG. 8 shows the overall construction of a digital broadcasting system that includes the STB that is the first embodiment of the present invention.

The following describes set top boxes (STB) that are a first and a second embodiment of the present invention, with reference to the drawings.
First Embodiment FIG. 8 shows the overall construction of a digital broadcasting system that includes the STB that is the first embodiment of the present invention.

This digital broadcasting system includes a broadcasting center 1, transfer paths 2, STBs 3 and 5, and televisions 4 and 6.

The broadcasting center 1 transmits packets that include digital information such as video and audio via the transfer path 2, which may be realized by cables or may be wireless, to the STBs 3 and 5 that are provided in households. These packets may be MPEG (Motion Pictures Experts Group) transport stream packets or MPEG packetized element stream packets. The STBs 3 and 5 select only the information desired by users from the information transmitted by the broadcasting center 1, and respectively output this information as video and audio output to the televisions 4 and 6 to which they are connected.

The following describes the construction of the STB 3. Note that the construction and operation of the STBs 3 and 5 are the same, so that only the STB 3 is described.

Figure 9:
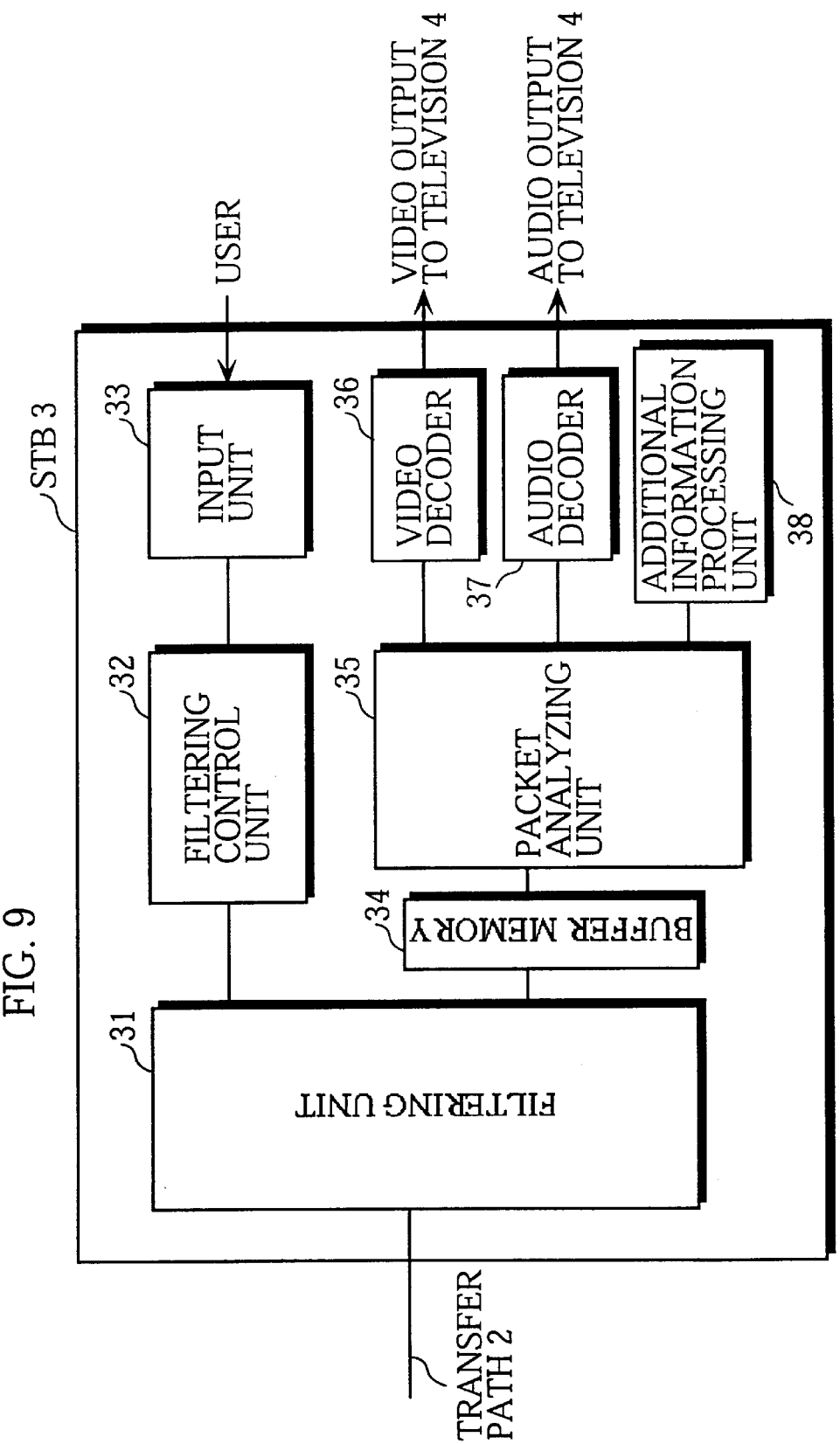
FIG. 9 is a block diagram showing the overall construction of the STB 3.

FIG. 9 is a block diagram showing the overall construction of the STB 3. As shown in the figure, the STB 3 includes the filtering unit 31, the filtering control unit 32, the input unit 33, the buffer memory 34, the packet analyzing unit 35, the video decoder 36, the audio decoder 37, and the additional information processing unit 38.

The user indicates his/her desired program using the input unit 33. In accordance with the indicated program, the filtering control unit 32 specifies the packets that include the data for the video and audio of this program, out of the packets transmitted by the broadcasting center 1 via the transfer path 2. The filtering unit 31 selects only the packets that have been specified by the filtering control unit 32 from the various packets that are received via the transfer path 2, and stores the selected packets into the buffer memory 34. The packet analyzing unit 35 analyzes the packets stored in the buffer memory 34 and generates video information, audio information, and additional information (information which is appended to the video and audio information, such as text for a program list showing the programs being broadcast) for the video decoder 36, the audio decoder 37, and the additional information processing unit 38, respectively. The video information and audio information are decoded by the video decoder 36 and the audio decoder 37, while the additional information is processed as required by the additional information processing unit 38. As a result, video and audio are outputted.

Figure 10:
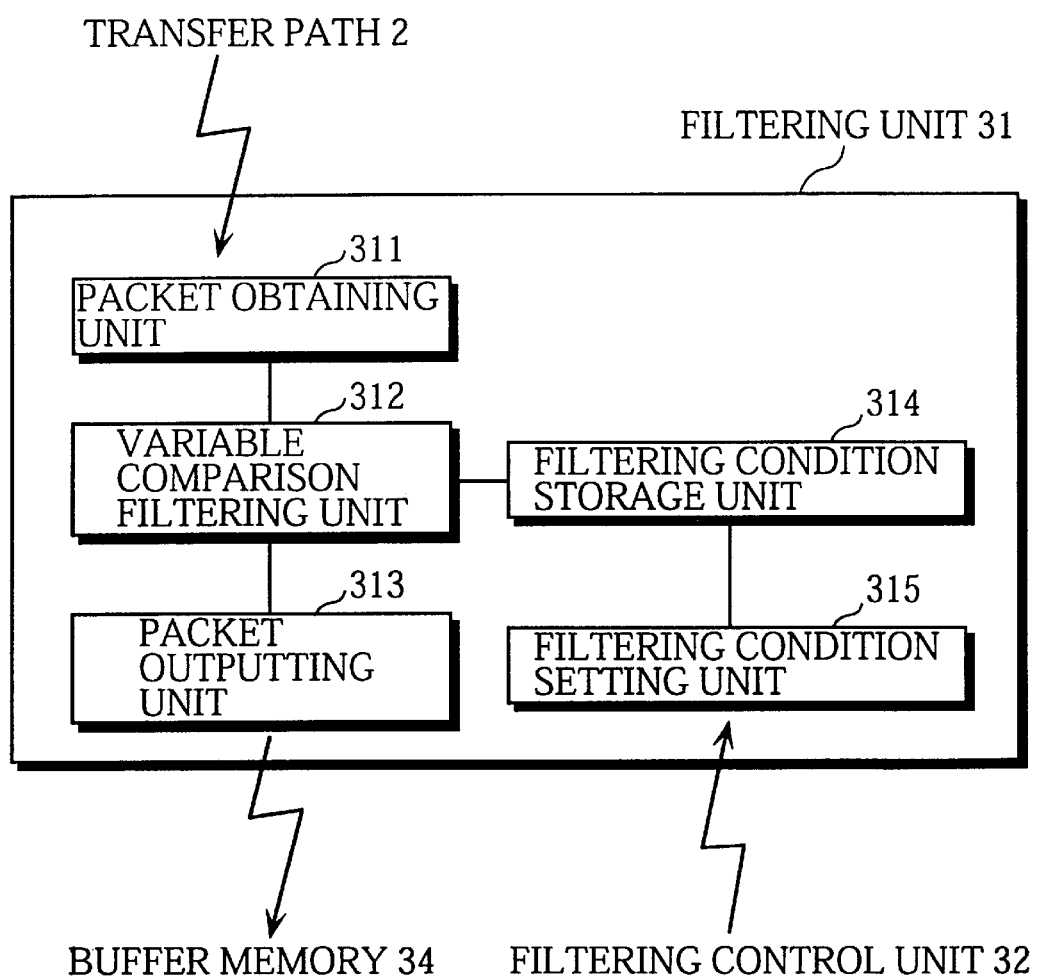
FIG. 10 shows the overall construction of the filtering unit 31.
Figure 13:
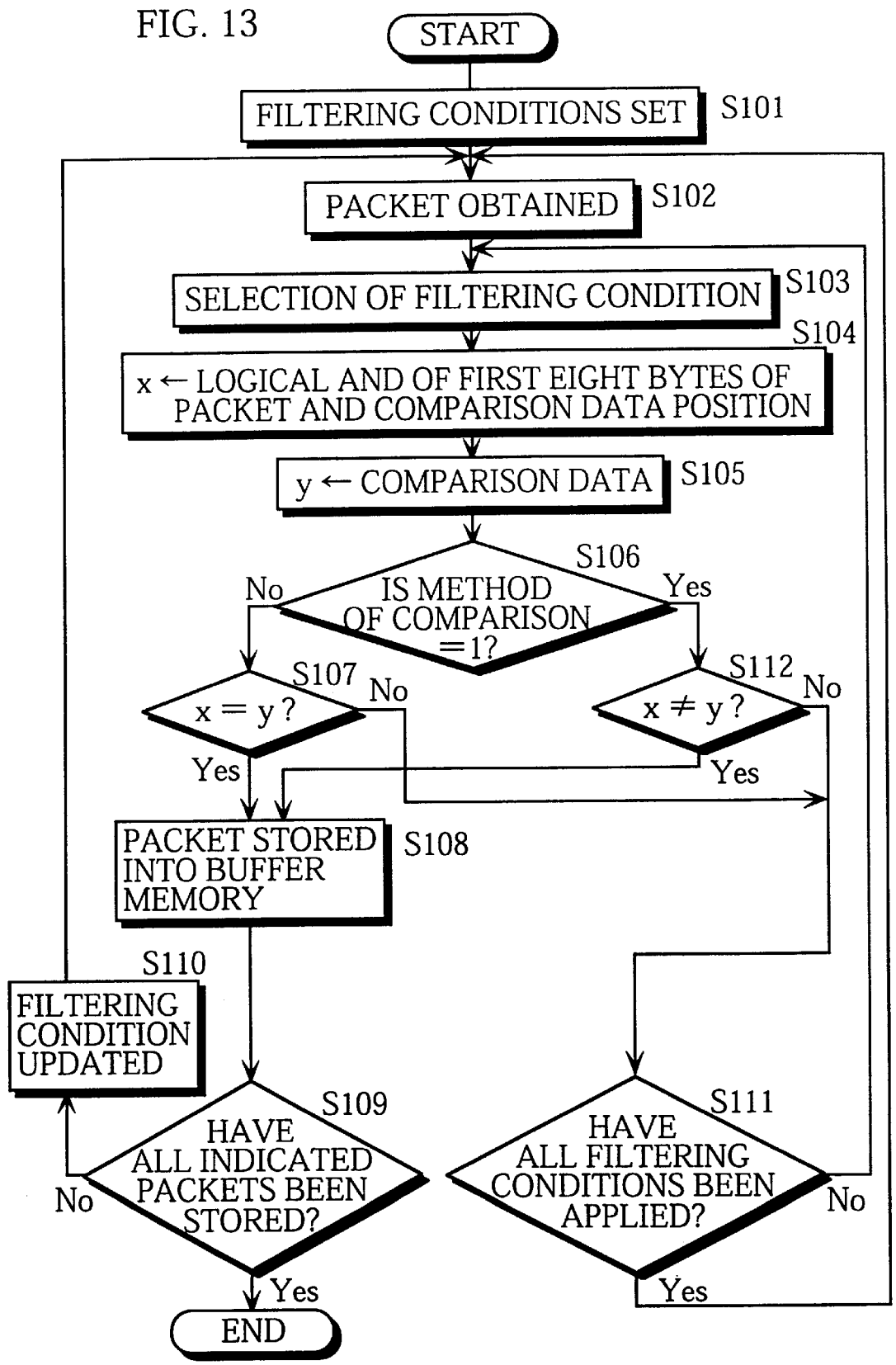
FIG. 13 is a flowchart showing the control procedure by which the filtering unit 31 filters packets.

In order to perform the appropriate filtering of packets that are received via the transfer path 2, the filtering unit 31 provided in the STB 3 has the construction shown in FIG. 10 and operates according to the control procedure shown in FIG. 13.

Figure 12:
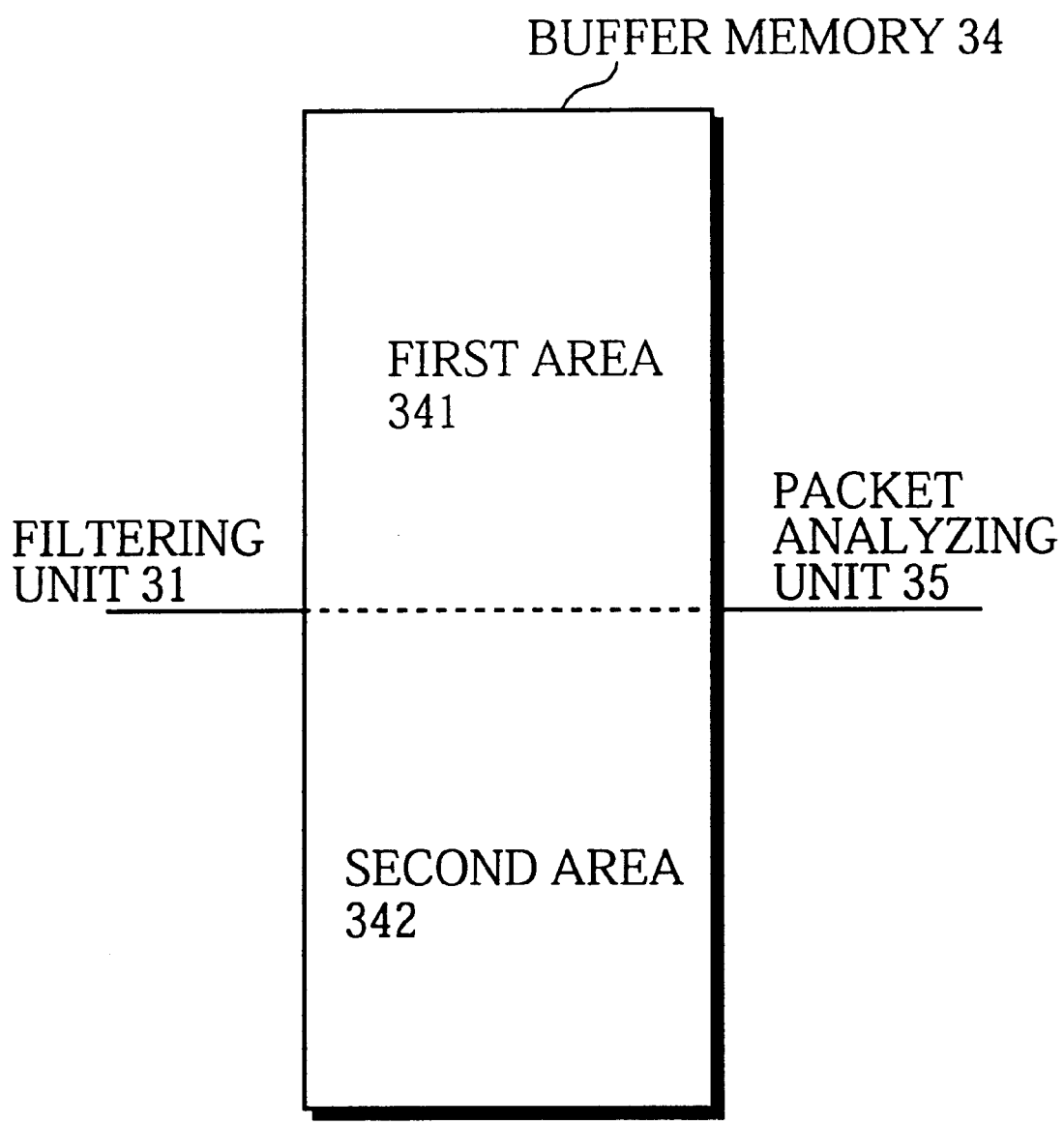
FIG. 12 shows the construction of the buffer memory 34.

FIG. 10 shows the overall construction of the filtering unit 31, while FIG. 11 shows examples of the filtering conditions stored in the filtering condition storage unit 314 and FIG. 12 shows the construction of the buffer memory 34. Here, it is assumed that the filtering unit 31 is implemented by hardware that is controlled by a microprogram.

As shown in FIG. 10, the filtering unit 31 includes a packet obtaining unit 311, a variable comparison filtering unit 312, a packet outputting unit 313, a filtering condition storage unit 314, and a filtering condition setting unit 315.

Figure 1:
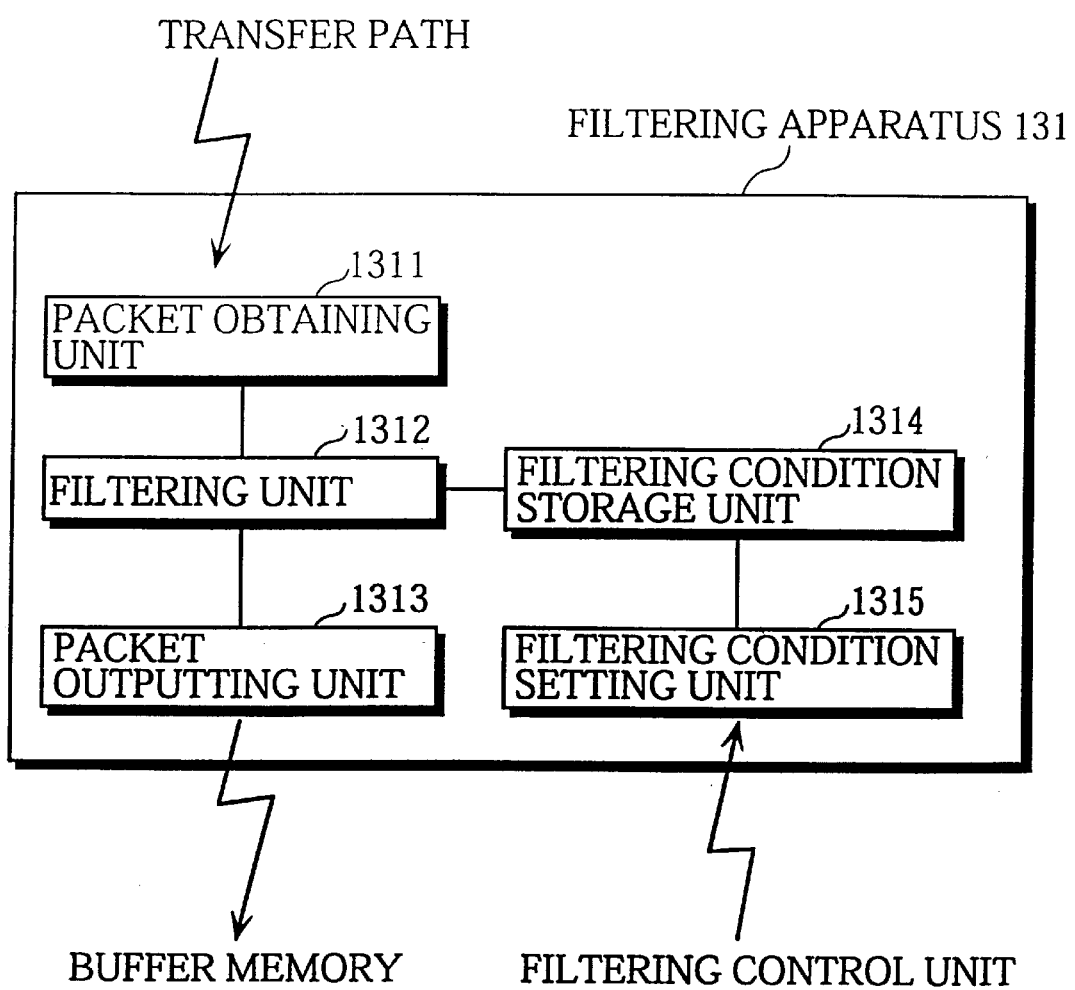
FIG. 1 is a block diagram showing the construction of a conventional filtering apparatus 131.
Figure 3:
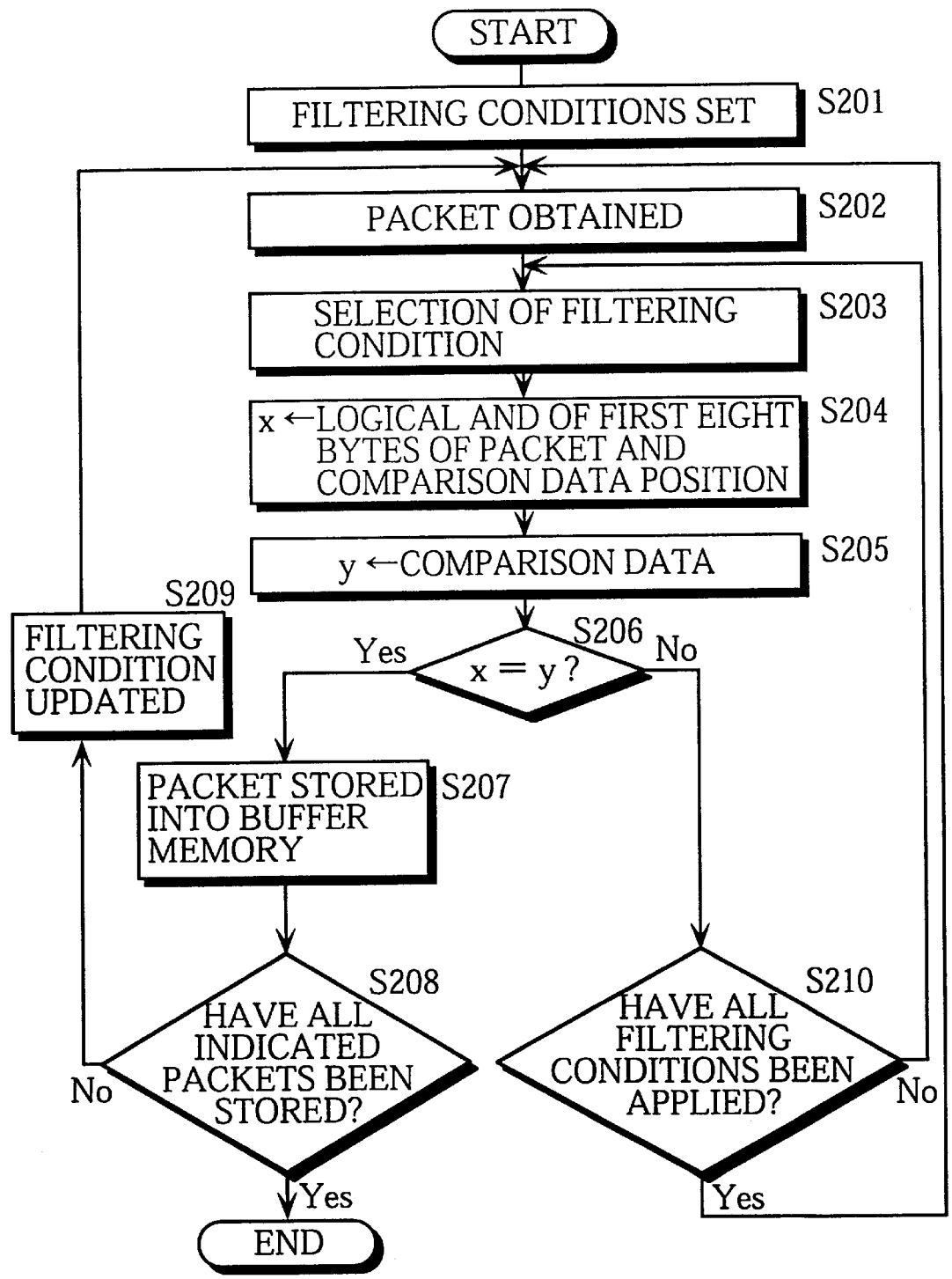
FIG. 3 is a flowchart showing the control procedure for the filtering of packets by a conventional filtering apparatus 131.

Of the above components, the packet obtaining unit 311, the packet outputting unit 313, the filtering condition storage unit 314, and the filtering condition setting unit 315 respectively have the same functions as the packet obtaining unit 1311r the packet outputting unit 1313, the filtering condition storage unit 1314, and filtering condition setting unit 1315 of the conventional filtering apparatus that was shown in FIG. 1. However, the variable comparison filtering unit 312 differs to the filtering unit 1312 of the conventional filtering apparatus by changing the method of comparison (described later), with this difference resulting in the operation of the various components of the filtering unit 31 differing from the operation of the corresponding components in the conventional filtering apparatus.

The packet obtaining unit 311 obtains a packet from the broadcasting center 1 (see FIG. 8) via the transfer path 2, and passes it on to the variable comparison filtering unit 312. The filtering control unit 32 indicates a plurality of groups of filtering conditions that include different methods of comparison to the filtering condition setting unit 315, which stores these filtering conditions into the filtering condition storage unit 314.

As shown in FIG. 11, each of the filtering conditions stored into the filtering condition storage unit 314 is composed of a filtering condition number for specifying the filtering condition, as well as a comparison data position, comparison data, and a method of comparison. The comparison data position, comparison data, and a method of comparison are used as described later in this specification. When the method of comparison is zero, this means that a comparison should be performed to see whether two values are equal, while when the method of comparison is one, this means that a comparison should be performed to see whether two values are not equal. Here, the filtering condition number and method of comparison are each composed of integers expressed using one byte, while the comparison data position and the comparison data itself are each composed of integers expressed using eight bytes. Note that these integers are expressed in hexadecimal.

On receiving a packet from the packet obtaining unit 311, the variable comparison filtering unit 312 (see FIG. 10) applies filtering conditions stored in the filtering condition storage unit 314 to judge whether the packet obtained by the packet obtaining unit 311 is necessary. The variable comparison filtering unit 312 sends only the packets it finds necessary to the packet outputting unit 313. The packet outputting unit 313 stores the packets it receives in this way into the buffer memory 34.

As shown in FIG. 12, the buffer memory 34 has a plurality of areas, with packets being stored into different areas according to which of the plurality of filtering conditions they satisfy. As one example, packets that satisfy filtering condition#1 in FIG. 11 are stored in the first area 341 in FIG. 12 and packets that satisfy filtering condition#2 in FIG. 11 are stored in the second area 342 in FIG. 12, with the packet analyzing unit 35 then processing the packets in accordance with which of the first area 341 and the second area 342 the packets have been stored in. Video and audio are therefore reproduced in accordance with the packets that are stored in the buffer memory 34 in this way.

Figure 15:
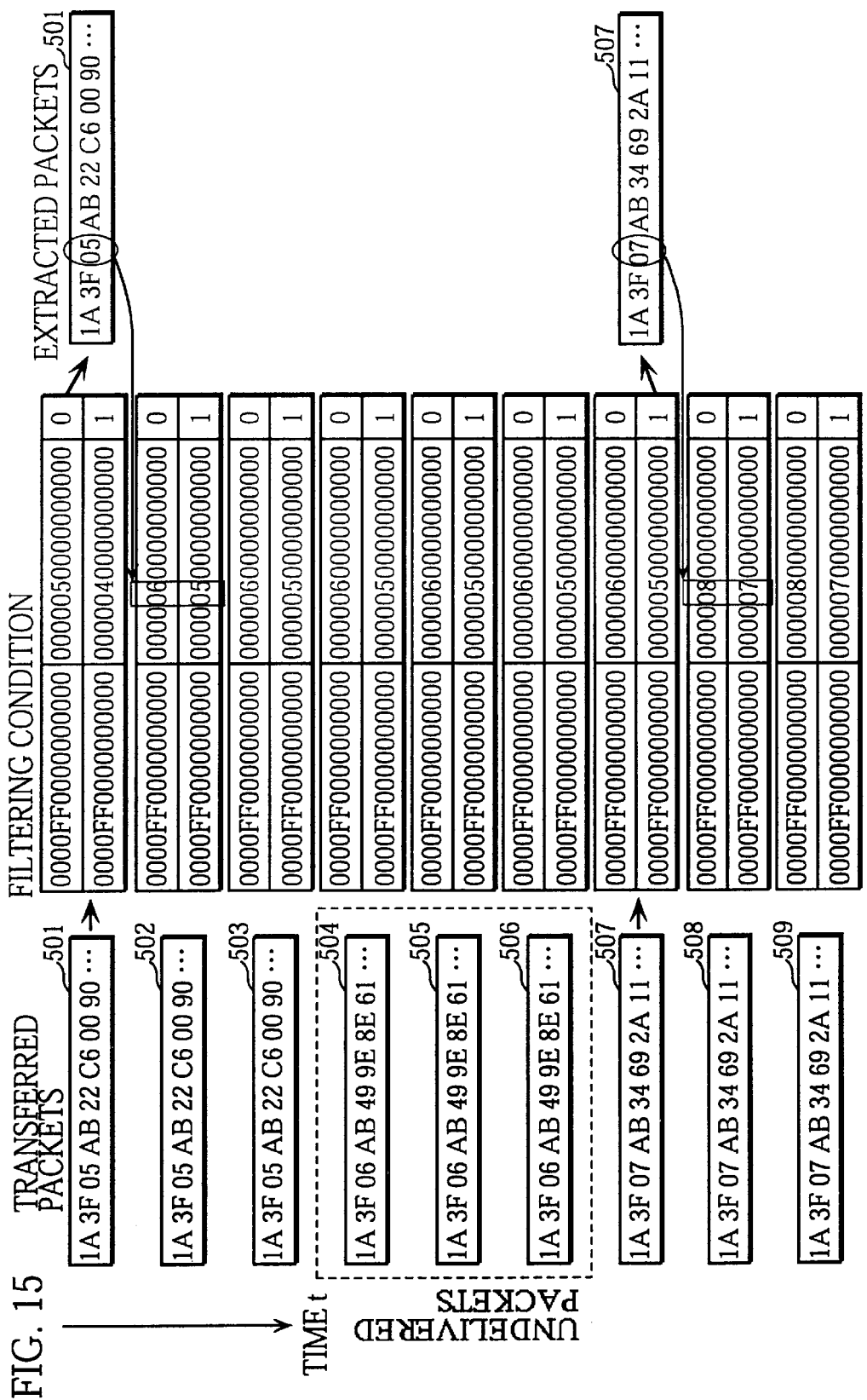
FIG. 15 shows an example of the filtering performed by the filtering unit 31 using the filtering conditions shown in FIG. 14.

The following describes the control procedure used when the filtering unit 31 performs filtering to determine whether an obtained packet is necessary, with reference to FIGS. 13–15.

Figure 4:
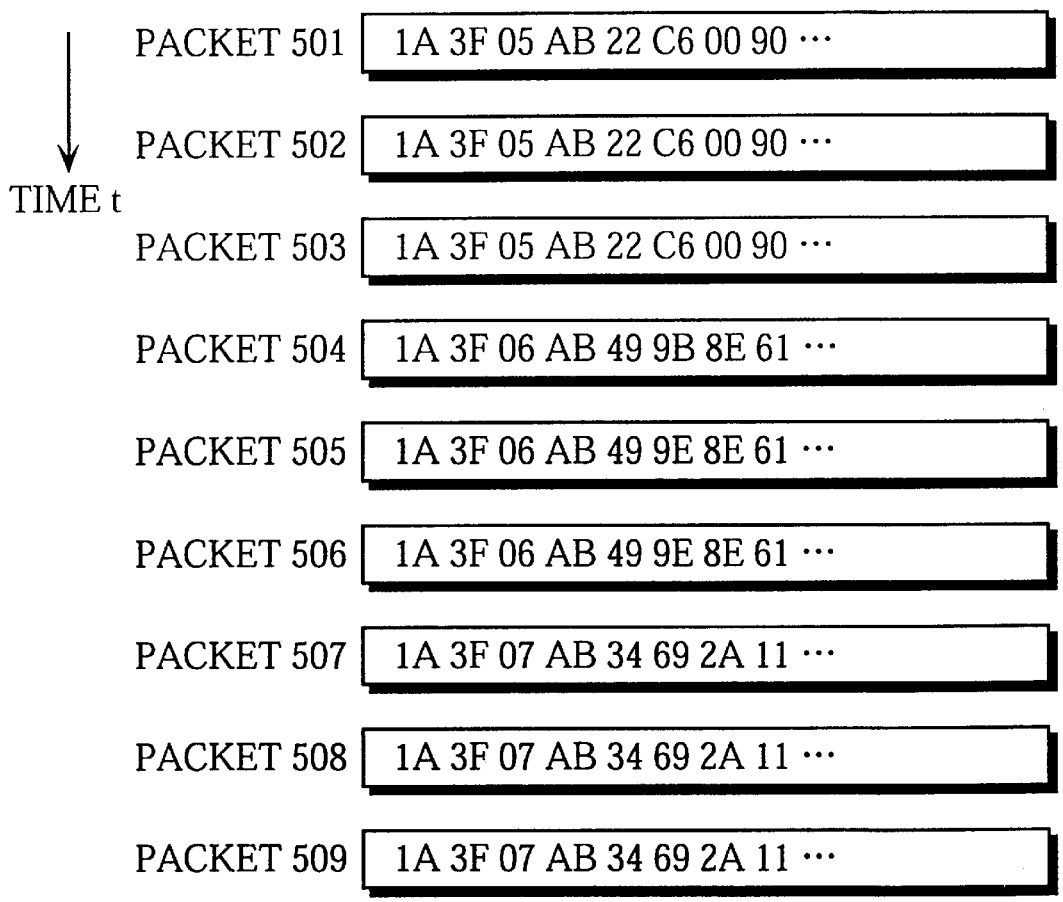
FIG. 4 shows the actual packets that are obtained by the packet obtaining unit 1311.
Figure 6:
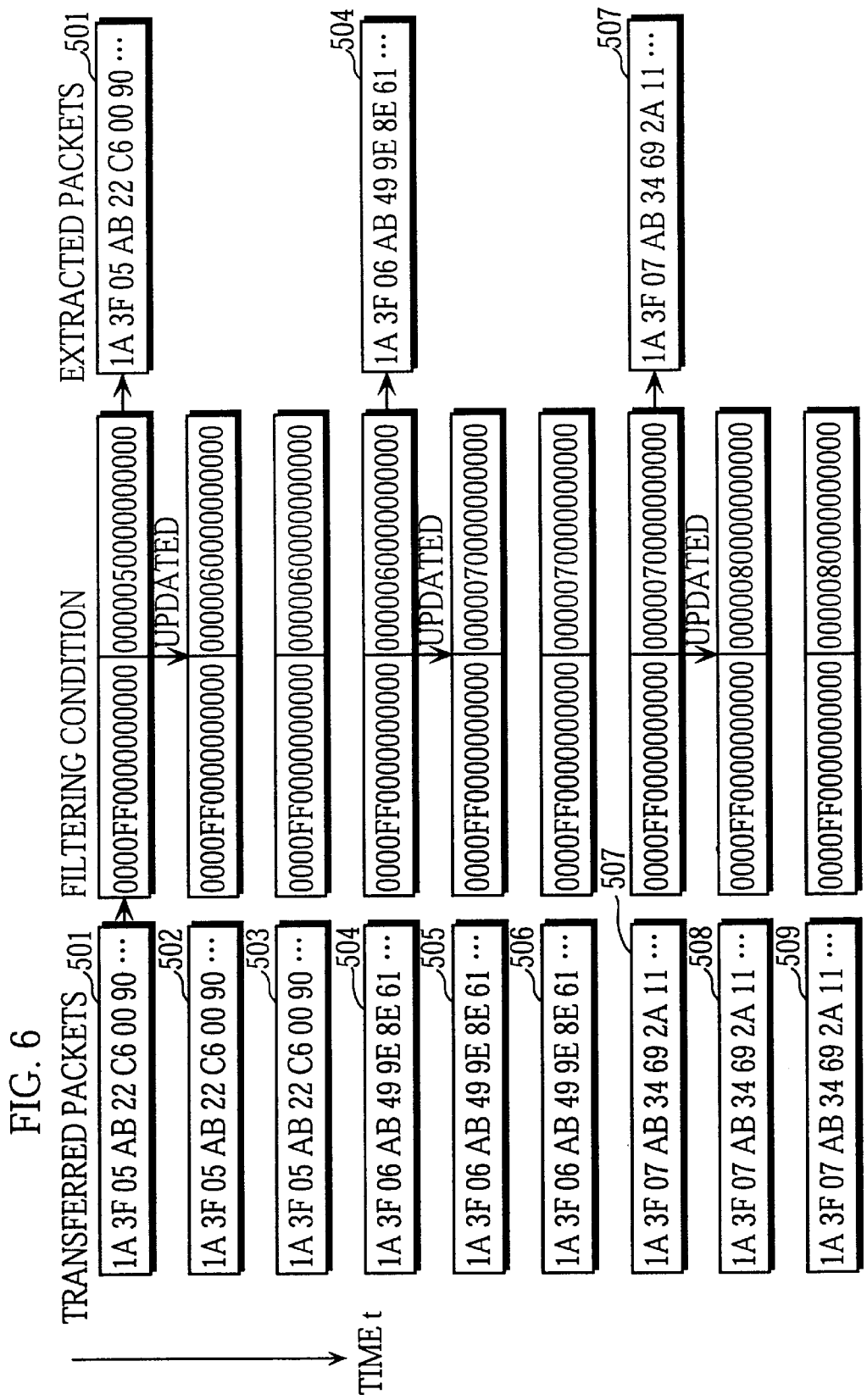
FIG. 6 shows the filtering performed by a conventional filtering apparatus 131.
Figure 7:
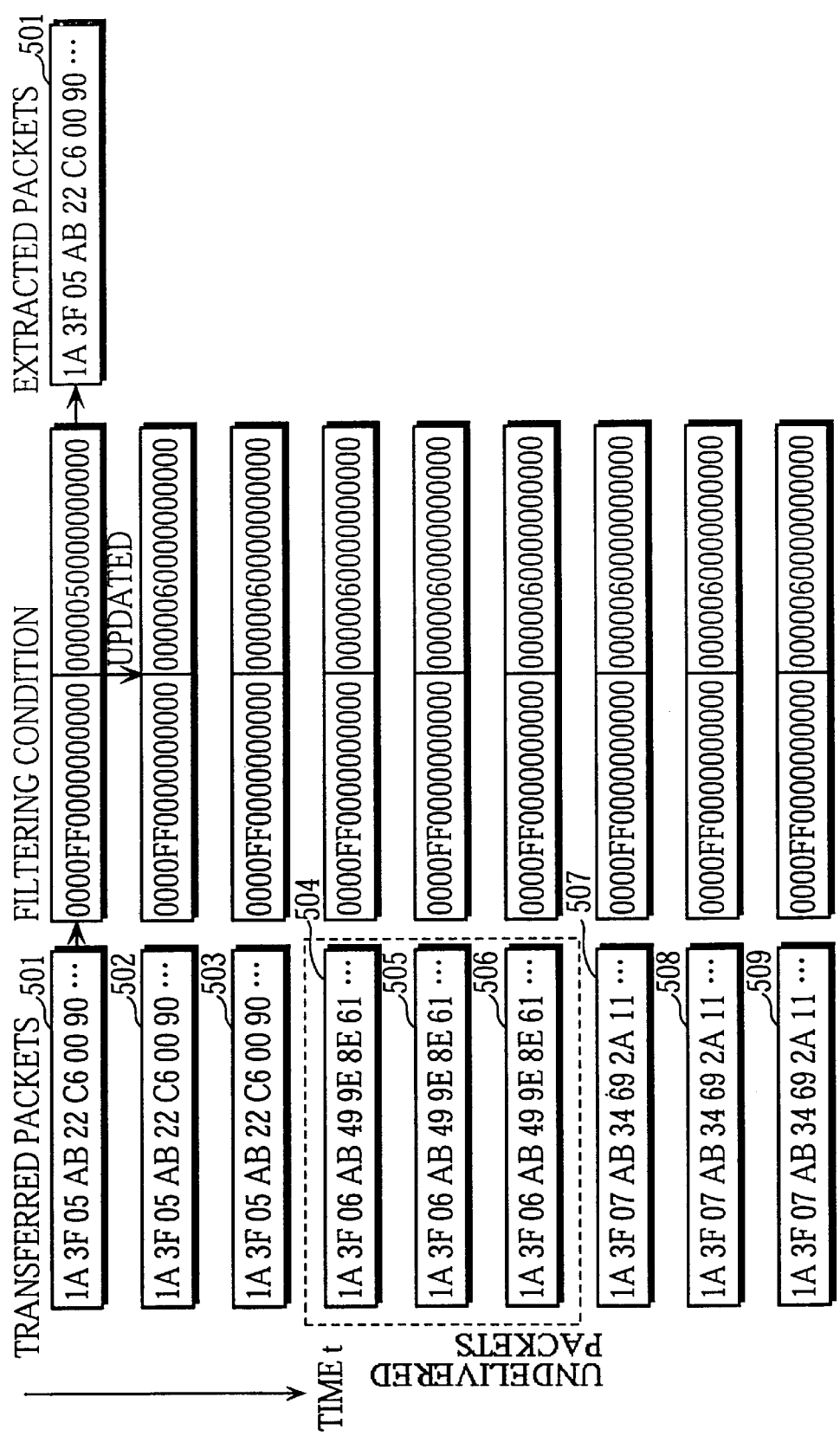
FIG. 7 shows the effects of a communication disruption on the filtering of packets by a conventional filtering apparatus 131.

FIG. 13 is a flowchart showing the control procedure by which the filtering unit 31 (see FIG. 10) filters packets. Here, it is assumed that the packet obtaining unit 311 obtains packets 501–509 shown in FIG. 4, in the same way as the conventional filtering apparatus 131 described earlier.

The filtering performed by the filtering unit 31 starts with an indication of a packet to be stored into the buffer memory 34 by the filtering control unit 32. In accordance with this packet, filtering conditions, such as those shown in FIG. 11, are set by the filtering condition setting unit 315 and are stored in the filtering condition storage unit 314 (S101). Next, one of the packets that are received in order via the transfer path 2 is obtained (S102), and one of the plurality of filtering conditions stored in the filtering condition storage unit 314 (S103) is selected.

Assume here that filtering condition#1 is selected first for the packet obtained by the packet obtaining unit 311, that a judgement is performed to see whether this packet satisfies this filtering condition, that filtering condition#2 is selected next, and that a similar judgement is performed.

A logical AND is calculated for the first eight bytes of the packet obtained by the packet obtaining unit 311 and the comparison data position of the selected filtering condition, and the result of this calculation is substituted into the variable x (S104). The comparison data of the filtering condition is substituted into variable y (S105).

As actual values, a logical AND is calculated for the comparison data position FFFF000000000000 of filtering condition#1 and the data 1A3F05AB22C60090 of packet 501 obtained by the packet obtaining unit 311. The resulting value 1A3F000000000000 is substituted into the variable x. The value 1A45000000000000 is substituted into the variable y.

Next, the filtering unit 31 refers to the method of comparison given in the selected filtering condition and judges whether the method of comparison is one (S106). Here, if the method of comparison is zero, this means that a comparison will be performed to see whether two values are equal, while if the method of comparison is one, this means that a comparison will be performed to see whether two values are not equal.

If the method of comparison is not one (S106:No), the filtering unit 31 judges whether x and y are equal (S107). If x and y are equal (S107:Yes), the packet obtained by the packet obtaining unit 311 is stored in the buffer memory 34 via the packet outputting unit 313 (S108). The filtering unit 31 then judges whether all of the indicated packets have been stored in the buffer memory 34 (S109).

If all of the indicated packets have been stored in the buffer memory 34 (S109:Yes), the present procedure ends. If all of the indicated packets have not been stored (S109:No), the filtering conditions in the filtering condition storage unit 314 are updated to new filtering conditions corresponding to the next packet to be stored into the buffer memory 34 (S110).

If the method of comparison is not one (S106;No) and x and y are not equal (S107:No), the filtering unit 31 then judges whether all of the filtering conditions have been applied (S111). If not (S111:No), a new filtering condition is selected in S103, and the above procedure is repeated. Conversely, if all of the filtering conditions have been applied (S111:Yes), a new packet is obtained in S102, and the above procedure is repeated.

If the method of comparison is one (S106:Yes), the filtering unit 31 judges whether x and y are not equal (S112). If x and y are not equal (S112:Yes), the processing proceeds to S108t but if x and y are equal (S112:No), the processing proceeds to S111. This means that depending on whether the method of comparison of x and y is one or zero, the processing taken in response to a result of the comparison of x and y will switch between a route from S108 onwards and a route from S111 onwards.

The following describes the processing when the processed packet is packet 501 and, based on filtering conditional, data is substituted into the variables x and y with zero being indicated as the method of comparison. Since the method of comparison is not one and the variables x and y are not equal (S106:No, S107:No), packet 501 is not stored into the buffer memory 34. The filtering condition is updated to filtering condition#2, and the procedure is repeated for packet 501 and filtering condition#2 (S111:No).

When the procedure is performed for packet 501 and filtering condition#2, the values of the variables are such that x=000000AB00000000, y=000000AC00000000, while the method of comparison is one. Since the method of comparison is one and x and y are not equal (S106:Yes, S112:Yes), packet 501 is stored into the buffer memory 34 (S108), and the filtering conditions in the filtering condition storage unit 314 are updated to the filtering conditions that correspond to the next packet to be stored into the buffer memory 34 (S110).

When one of the filtering conditions described above corresponds to the version number of a packet and there is a disruption to the communication on the transfer path 2 (see FIG. 10) which prevents packets 504–506 from reaching the STB 3, the filtering unit 31 filters packets in the special manner as described below.

FIG. 14 shows the filtering conditions stored in the filtering condition storage unit 314 (see FIG. 10) that correspond to version numbers, while FIG. 15 shows an example of the filtering performed by the filtering unit 31 using the filtering conditions shown in FIG. 14.

Once packet 501 has been received, the variable comparison filtering unit 312 can indicate a condition stipulating that the version number is not five as one of the filtering conditions. The filtering unit 31 does this by indicating a filtering condition in the filtering condition storage unit 314, the filtering condition (shown in FIG. 14) having 0000FF0000000000 as the comparison data position, 0000050000000000 as the comparison data, and one as the method of comparison. Note that the other filtering condition that is paired with this filtering condition stipulates that the version number is six, so that the filtering of packets can be performed as normal when there are no disruptions to the communication.

As shown in FIG. 15, once packet 501 has been received as normal, the filtering conditions described above are indicated to the variable comparison filtering unit 312, which discards packets 502 and 503 in accordance with these filtering conditions and so does not output these packets to the packet outputting unit 313. However when packet 507 arrives, the variable comparison filtering unit 312 will have this packet 507 stored into the buffer memory 34 via the packet outputting unit 313. After packet 507 has been successfully received in this way, a filtering condition stipulating that the version number is not seven (seven being the version number of this packet 507 that has just been received) is indicated, so that control can be performed to prevent packets 508 and 509 from being outputted to the packet outputting unit 313 and stored into the buffer memory 34.

In this way, the filtering unit 31 of the STB of this first embodiment of the present invention filters packets in a flexible manner. when a version number is indicated as the filtering condition, the filtering unit 31 minimizes the effect on the STB of the failure of packets to reach the STB due to a disruption on the transfer path. This makes the filtering very efficient.

Second Embodiment

Figure 16:
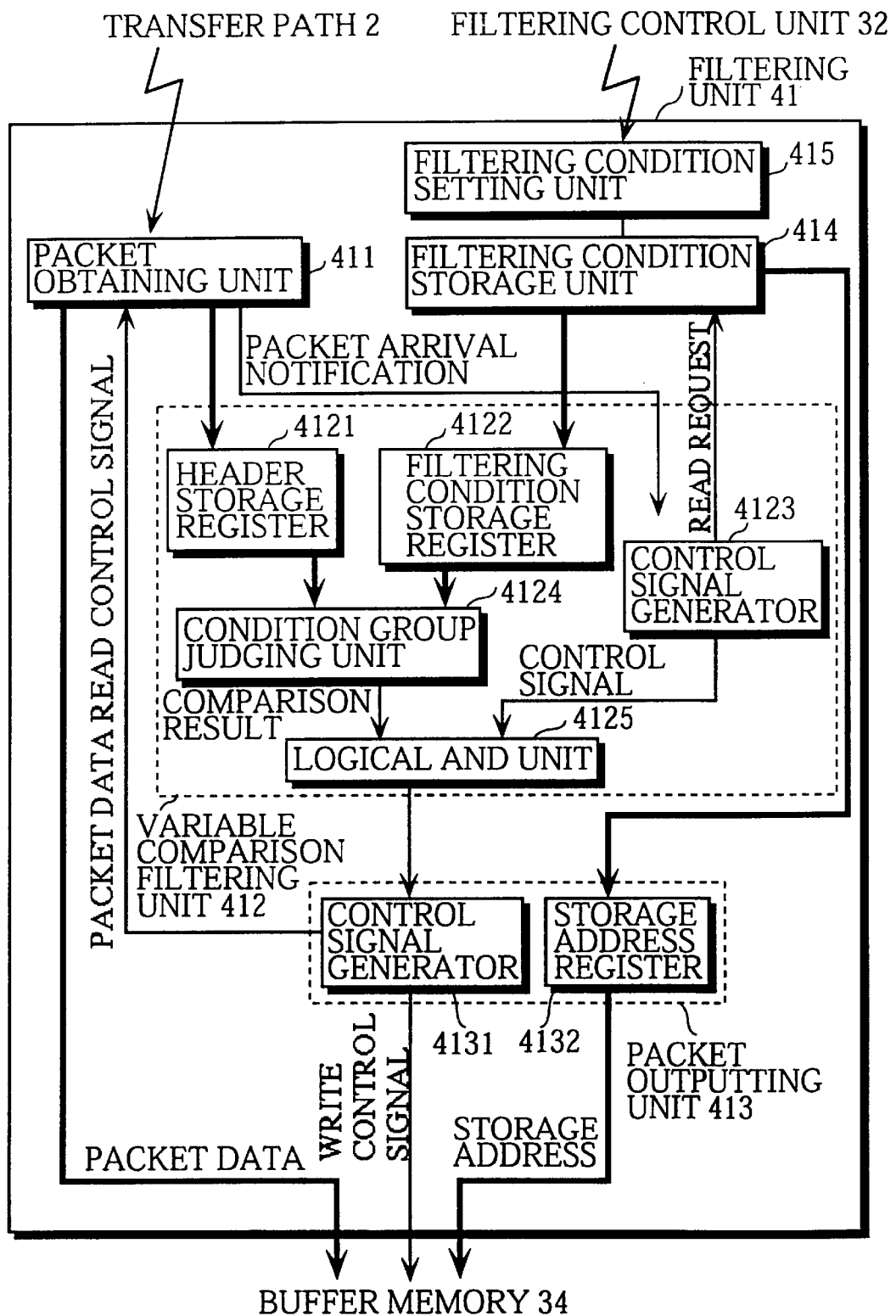
FIG. 16 is a block diagram showing the construction of the filtering unit 41 provided in an STB that is the second embodiment of the present invention.
Figure 17:
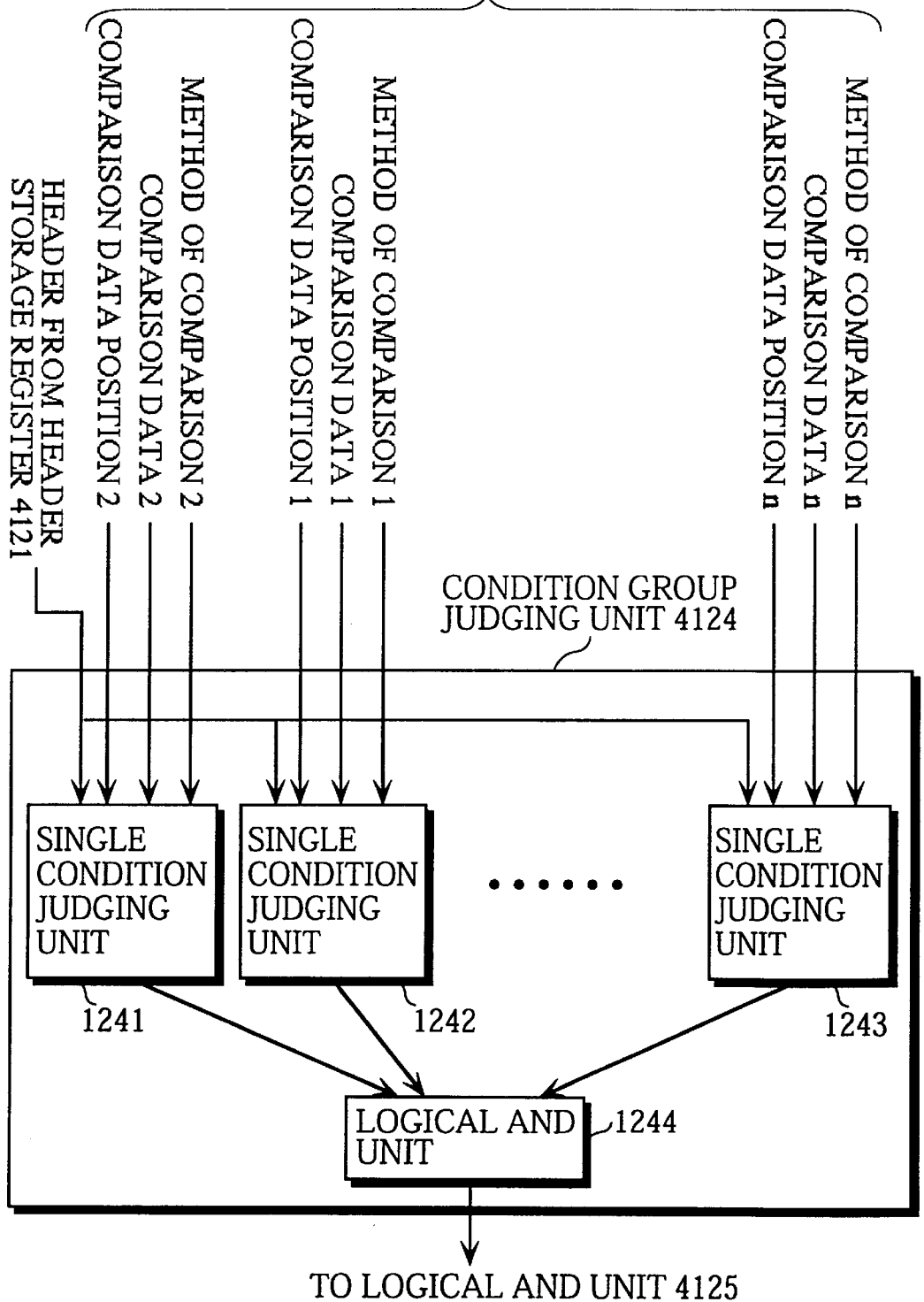
FIG. 17 shows the construction of the condition group judging unit 4124 shown in FIG. 16.
Figure 18:
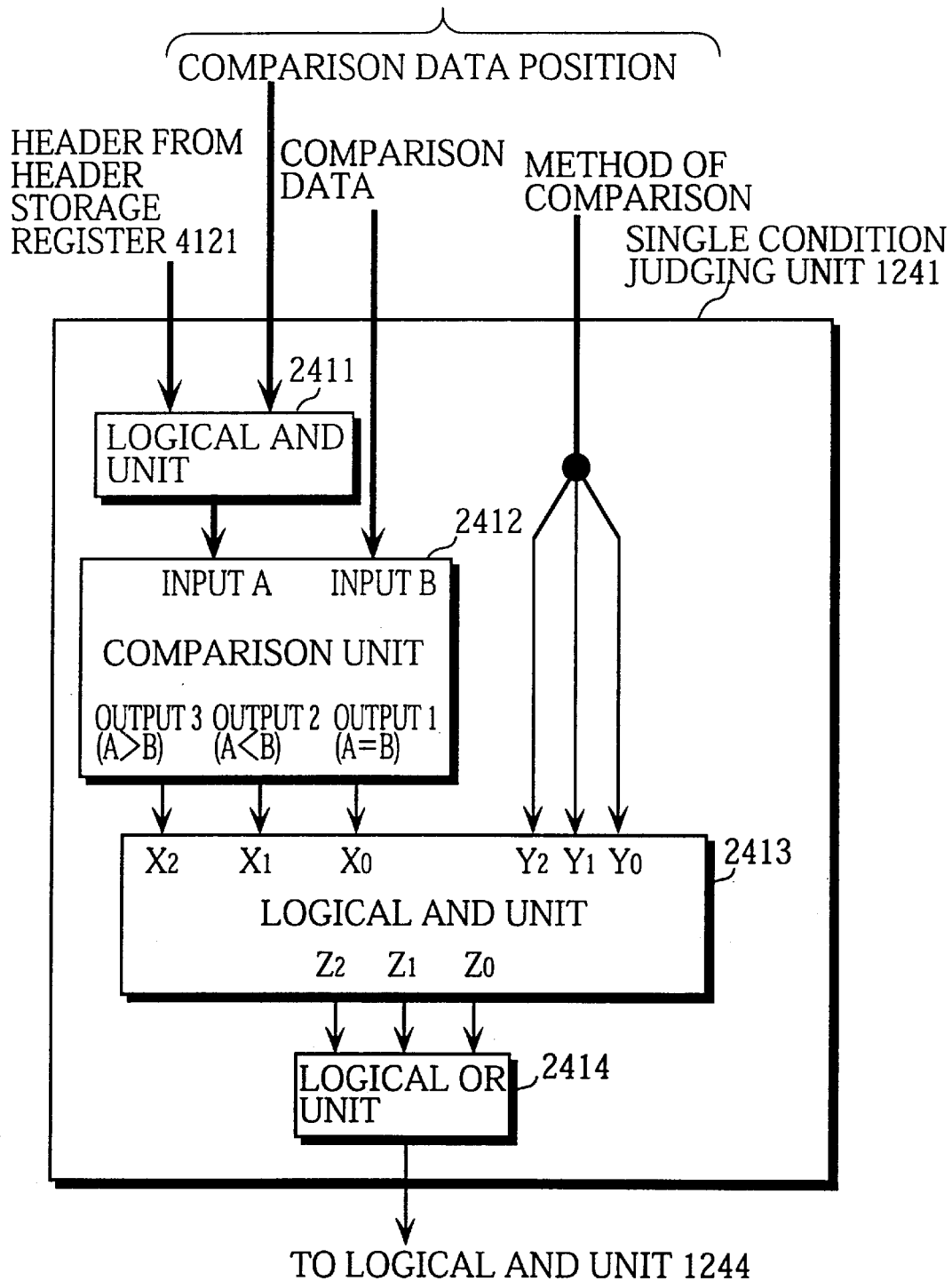
FIG. 18 shows the construction of the single condition judging unit 1241 (or 1242 or 1243) shown in FIG. 17.
Figure 21:
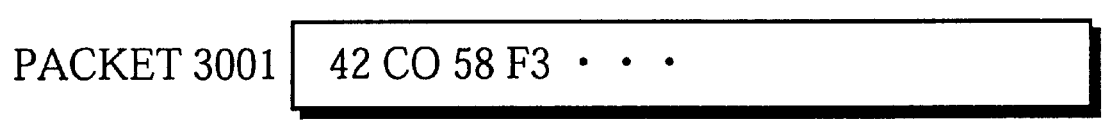

The following describes an STB that is a second embodiment of the present invention. FIG. 16 is a block diagram showing the construction of the filtering unit 41 provided in an STB that is the second embodiment of the present invention. FIG. 17 shows the construction of the condition group judging unit 4124 shown in FIG. 16. FIG. 18 shows the construction of the single condition judging unit 1241 shown in FIG. 17. Note that the construction of the single condition judging units 1242 and single condition judging unit 1243 are the same as the single condition judging unit 1241. FIG. 19 shows examples of the filtering conditions stored in the filtering condition storage unit 414. FIG. 20 shows examples of the meanings attached to the values used to indicate the method of comparison. FIG. 21 shows examples of the packets that are transferred.

Note that FIGS. 16 and 19 for the filtering unit 41 correspond to FIGS. 10 and 11 for the filtering unit 31 that is included in the STB of the first embodiment. Also while, the filtering unit 31 was described as being implemented by hardware that is controlled by microprograms, it is assumed that the filtering unit 41 of the present embodiment is implemented by hardware that is controlled by wired logic.

As shown in FIG. 16, the filtering unit 41 includes the packet obtaining unit 411, the variable comparison filtering unit 412, the packet outputting unit 413, the filtering condition storage unit 414, and the filtering condition setting unit 415. Of these, the variable comparison filtering unit 412 includes the header storage register 4121, the filtering condition storage register 4122, the control signal generator 4123, the condition group judging unit 4124, and the logical AND unit 4125. The packet outputting unit 413 includes the control signal generator 4131 and the storage address register 4132.

Of the components of the filtering unit 41, the packet obtaining unit 411, the filtering condition storage unit 414, and the filtering condition setting unit 415 respectively have the same functions as the packet obtaining unit 1311, the filtering condition storage unit 1314, and filtering condition setting unit 1315 of the conventional filtering apparatus that was shown in FIG. 1. The following description will therefore concentrate on the construction and operation of the variable comparison filtering unit 412 of the present invention, and on the operation of other components with respect to the variable comparison filtering unit 412.

The filtering condition storage unit 414 stores filtering conditions, such as those shown in FIG. 19. Each filtering condition is composed of a filtering condition number for specifying the filtering condition, two condition groups, and a storage address indicating a first address in the buffer memory 34 for storing a packet that satisfies both of the two condition groups. Each of the condition groups in a filtering condition is composed of a comparison data position, comparison data, and a method of comparison. The values used to express the method of comparison have the meanings shown in FIG. 20. In this embodiment, a filtering condition is only satisfied if all of the conditions expressed by its condition groups are satisfied.

The packet obtaining unit 411 obtains a packet (such as one of those shown in FIG. 21) from outside via the transfer path 2. On obtaining a packet, the packet obtaining unit 411 writes the header of the packet (here, assumed to be the first four bytes of the packet) into the header storage register 4121 and sends a packet arrival notification to the control signal generator 4123.

On receiving a packet arrival notification, the control signal generator 4123 sends a read request for a filtering condition (out of the plurality of filtering conditions that have different methods of comparison) to the filtering condition storage unit 414. Based on this read request, the filtering condition storage unit 414 writes the first filtering condition (minus the storage address) into the filtering condition storage register 4122, and writes the storage address into the storage address register 4132.

The condition group judging unit 4124 (described later with reference to FIGS. 17 and 18) uses the content of the header storage register 4121 and the content of the filtering condition storage register 4122 to judge whether the header satisfies the filtering condition, and outputs the comparison result to the logical AND unit 4125. This comparison result is one when the filtering condition is satisfied and zero when the filtering condition is not satisfied.

After sending the read request to the filtering condition storage unit 414, the control signal generator 4123 waits for a predetermined time (which is longer that the time required by the processing of the condition group judging unit 4124) before sending a control signal to the logical AND unit 4125. If the output of the condition group judging unit 4124 is one when this control signal is received from the control signal generator 4123, the logical AND unit 4125 outputs the control signal to the control signal generator 4131. However, if the output of the condition group judging unit 4124 is zero at this time, the logical AND unit 4125 continuously outputs a zero signal.

On receiving the above control signal from the logical AND unit 4125, the control signal generator 4131 sends a packet data read control signal to the packet obtaining unit 411. This signal results in packet data being outputted from the packet obtaining unit 411 to the buffer memory 34 and a write control signal being outputted from the control signal generator 4131 to the buffer memory 34. The content of the storage address register 4132 (i.e., the storage address indicated for each filtering condition) is inputted into the buffer memory 34 as an address value. The output of the above control signal results in the packet data from the packet obtaining unit 411 being written into the address in the buffer memory 34 that is indicated by the storage address register 4132.

The following is a detailed description of the construction of the condition group judging unit 4124 that performs the above control procedure for the transferred packets. This description refers to FIG. 17. The construction of the single condition judging unit 1241 inside in the condition group judging unit 4124 is also described with reference to FIG. 18.

As shown in FIG. 17, the condition group judging unit 4124 includes: the single condition judging unit 1241 for judging whether the header of the obtained packet satisfies condition group 1 (composed of comparison data position 1, comparison data 1, and method of comparison 1); the single condition judging unit 1242 for judging whether the header of the obtained packet satisfies condition group 2 (composed of comparison data position 2, comparison data 2, and method of comparison 2); . . . ; the single condition judging unit single condition judging unit 1243 for judging whether the header of the obtained packet satisfies condition group n (composed of comparison data position n, comparison data n, and method of comparison n): and a logical AND unit 1244. Note that the number n of single condition judging units corresponds to the number of condition groups, so that for the filtering conditions shown in FIG. 19, the number n can be set at two.

The outputs of every single condition judging unit are inputted into the logical AND unit 1244 which calculates a logical AND for the outputs. These outputs are set at one when the condition stipulated by each condition group is satisfied. Accordingly, the output of the logical AND unit 1244 will only be one when the output of every single condition judging unit is one (i.e., every condition stipulated by the condition groups is satisfied). In all other cases, the output from the logical AND unit 1244, which is to say, the output of the condition group judging unit 4124, will be zero.

The single condition judging unit 1241 receives an input of the header of the obtained packet and the condition stipulated by the condition group, and outputs a signal showing whether the condition is satisfied. As shown in FIG. 18, the single condition judging unit 1241 includes a logical AND unit 2411 that calculates a logical AND for each bit, a comparator 2412 that compares the calculation result of the logical AND unit 2411 and the comparison data, a logical AND unit 2413 that calculates a logical AND for each bit, and a logical OR unit 2414 that calculates a logical OR for the output bits of the logical AND unit 2413.

The logical AND unit 2411 receives an input of the header of the obtained packet and the comparison data position (of condition group 1). The logical AND unit 2411 calculates a logical AND for each bit in the inputted data and outputs its calculation result to the comparator 2412.

The comparator 2412 receives the calculation result of the logical AND unit 2411 as input A and the comparison data as input B. As output 3, the comparator 2412 outputs one when input A is greater than input B, and zero when input A is not greater than input B. As output 2, the comparator 2412 outputs one when input A is smaller than input B, and zero when input A is not smaller than input B. As output 1, the comparator 2412 outputs one when input A is equal to input B, and zero when input A is not equal to input B.

The logical AND unit 2413 receives an input of the outputs 3-1 of the comparator 2412 as the inputs X2-X0 and an input of the method of comparison (whose value is explained in FIG. 20) as the inputs Y2-Y0. The logical AND unit 2413 calculates a logical AND for bit position in inputs X2-X0 with the corresponding bit position in inputs Y2-Y0, and outputs its calculation results as the outputs Z2-Z0. This means that a logical AND is calculated for the output 1 of the comparator 2412 (i.e., input X0) and the lowest bit (input Y0) of the method of comparison, with the result of this calculation being outputted as the output Z0. In the same way, a logical AND is calculated for the output 2 of the comparator 2412 (i.e., input X1) and the second lowest bit (input Y1) of the method of comparison, with the result of this calculation being outputted as the output Z1, and a logical AND is calculated for the output 3 of the comparator 2412 (i.e., input X2) and the third lowest bit (input Y2) of the method of comparison, with the result of this calculation being outputted as the output Z2.

The logical OR unit 2414 receives an input of the outputs Z2-Z0 of the logical AND unit 2413, calculates a logical OR for these values, and outputs the result.

Since the single condition judging unit 1241 has the construction described above, the value of the method of comparison can be set as follows to express any of the methods of comparison shown in FIG. 20. When the lowest bit is one, this shows that the result of the logical AND taken for the header and the comparison data position is equal to the comparison data. When the second lowest bit is one, this shows that the result of the logical AND taken for the header and the comparison data position is smaller than the comparison data. When the third lowest bit is one, this shows that the result of the logical AND taken for the header and the comparison data position is larger than the comparison data.

The following describes an actual example of the filtering performed by the filtering unit 41 described above. This example describes the operation of the components shown in FIGS. 16–18 for the case where each of the filtering conditions shown in FIG. 19 is stored in the filtering condition storage unit 414 and packet 3001 shown in FIG. 21 has been obtained by the packet obtaining unit 411. This packet 3001 in FIG. 21 does not satisfy filtering condition#1, so it is investigated whether it is possible to write this packet into the buffer memory 34 according to the two filtering conditions #1 and #2 that contain different methods of comparison.

The following describes the investigation into whether filtering condition#1 is satisfied when the packet obtaining unit 411 (see FIG. 16) has obtained packet 3001. First, the header "42C058F3" of packet 3001 is written into the header storage register 4121 and a packet arrival notification is sent to the control signal generator 4123. The control signal generator 4123 sends a read request to the filtering condition storage unit 414, and the content of the first filtering condition (filtering condition#1) read from the filtering condition storage unit 414 is written into filtering condition storage register 4122.

In accordance with condition group 1 of filtering condition#1, the single condition judging unit 1241 in the condition group judging unit 4124 receives an input of the header of packet 3001, the comparison data position 1 (=F000000), the comparison data 1 (=30000000), and the method of comparison 1 (=1). Note that it is assumed in this example that the condition group judging unit 4124 includes two single condition judging units, the single condition judging unit 1241 and the single condition judging unit 1242.

The logical AND unit 2411 (see FIG. 18) in the single condition judging unit 1241 obtains the result "40000000" by calculating a logical AND for the header and the comparison data position 1. The comparator 2412 compares this result (input A) with the comparison data 1 (input B), and outputs one as output 3, zero as output 2, and zero as output 1 as the result "40000000" is greater than the comparison data 1 "30000000". The logical AND unit 2413 receives an input of the above outputs "100" (expressed in binary) as the inputs X2-X0, and the method of comparison 1 "001" (also expressed in binary) as the inputs Y2-Y0. The logical AND unit 2413 calculates a logical AND for these inputs to give the result "000" (in binary). This result (i.e., the outputs Z2-Z0 of the logical AND unit 2413) is inputted into the logical OR unit 2414 which calculates a logical OR for these inputs to give the result "0". This means that packet 3001 is judged as not satisfying the condition of condition group 1 in the filter condition#1.

In the same way, the single condition judging unit 1242 in the condition group judging unit 4124 receives an input of the header of packet 3001, the comparison data position 2 (=00FF0000), the comparison data 2 (=00E30000), and the method of comparison 2 (=2), in accordance with condition group 2 of filtering condition#1.

The logical AND unit 2411 (see FIG. 18 and note that the components of the single condition judging unit 1242 are given the same reference numerals as the components of the single condition judging unit 1241) in the single condition judging unit 1242 obtains the result "00C00000" by calculating a logical AND for the header and the comparison data position 2. The comparator 2412 compares this result (input A) with the comparison data 2 (input B), and outputs zero as output 3, one as output 2, and zero as output 1 as the result "00C00000" is smaller than the comparison data 2 "00E30000". The logical AND unit 2413 receives an input of the above outputs "010" (expressed in binary) as the inputs X2-X0, and the method of comparison 2 "010" (also expressed in binary) as the inputs Y2-Y0. The logical AND unit 2413 calculates a logical AND for these inputs to give the result "010" (in binary). This result (i.e., the outputs Z2-Z0 of the logical AND unit 2413) is inputted into the logical OR unit 2414 which calculates a logical OR for these inputs to give the result "1" This means that packet 3001 is judged as satisfying the condition of condition group 2 in the filter condition#1.

The logical AND unit 1244 in the condition group judging unit 4124 (see FIG. 17) receives the output "0" of the single condition judging unit 1241 and the output "1" of the single condition judging unit 1242 and calculates a logical AND for these values to produce the calculation result "0". This value is the output of the condition group judging unit 4124, and means that packet 3001 is judged as not satisfying filtering condition#1.

After sending a read request to the filtering condition storage unit 414, the control signal generator 4123 (see FIG. 16) waits for the predetermined time and then sends a control signal to the logical AND unit 4125. As described abover the output of the condition group judging unit 4124 is "0", so that the logical AND unit 4125 continuously outputs "0" to the control signal generator 4131 (in the packet outputting unit 413). This means that a write of packet 3001 into the buffer memory 34 is not performed for filtering condition#1.

Following this investigation into whether packet 3001 satisfies filtering condition#1, an investigation is next performed into whether packet 3001 satisfies filtering condition#2.

The investigation into whether packet 3001 satisfies filtering condition#2 starts with the control signal generator 4123 sending a read request to the filtering condition storage unit 414 and the content of the second filtering condition (filtering condition#2) in the filtering condition storage unit 414 being written into the filtering condition storage register 4122.

As described earlier, the single condition judging unit 1241 in the condition group judging unit 4124 (see FIG. 17) receives an input of the header of packet 3001, the comparison data position 1 (=F0000000), the comparison data 1 (=40000000), and the method of comparison 1 (=1), in accordance with condition group 1 of filtering condition#2.

The logical AND unit 2411 (see FIG. 18) in the single condition judging unit 1241 obtains the result "40000000" by calculating a logical AND for the header and the comparison data position 1. The comparator 2412 compares this result (input A) with the comparison data 1 (input B), and outputs zero as output 3, zero as output 2, and one as output 1 as the result "40000000" is equal to the comparison data 1 "40000000". The logical AND unit 2413 receives an input of the above outputs "001" (expressed in binary) as the inputs X2-X0, and the method of comparison 1 "0001" (also expressed in binary) as the inputs Y2-Y0. The logical AND unit 2413 calculates a logical AND for these inputs to give the result "001" (in binary). This result (i.e., the outputs Z2-Z0 of the logical AND unit 2413) is inputted into the logical OR unit 2414 which calculates a logical OR for these inputs to give the result "1". This means that packet 3001 is judged as satisfying the condition of condition group 1 in the filter condition#2.

In the same way, the single condition judging unit 1242 in the condition group judging unit 4124 receives an input of the header of packet 3001, the comparison data position 2 (=0000FF00), the comparison data 2 (=00005600), and the method of comparison 2 (=5), in accordance with condition group 2 of filtering condition#2.

The logical AND unit 2411 in the single condition judging unit 1242 obtains the result "00005800" by calculating a logical AND for the header and the comparison data position 2. The comparator 2412 compares this result (input A) with the comparison data 2 (input B), and outputs one as output 3, zero as output 2, and zero as output 1 as the result "00005800" is greater than the comparison data 2 "00005600". The logical AND unit 2413 receives an input of the above outputs "100" (expressed in binary) as the inputs X2-X0, and the method of comparison 2 "101" (also expressed in binary) as the inputs Y2-Y0. The logical AND unit 2413 calculates a logical AND for these inputs to give the result "100" (in binary). This result (i.e., the outputs Z2-Z0 of the logical AND unit 2413) is inputted into the logical OR unit 2414 which calculates a logical OR for these inputs to give the result "1". This means that packet 3001 is judged as satisfying the condition of condition group 2 in the filter condition#2.

The logical AND unit 1244 in the condition group judging unit 4124 (see FIG. 17) receives the output "1" of the single condition judging unit 1241 and the output "1" of the single condition judging unit 1242 and calculates a logical AND for these values to produce the calculation result "1". This value is the output of the condition group judging unit 4124, and shows that packet 3001 is judged as satisfying filtering condition#2.

After sending a read request to the filtering condition storage unit 414, the control signal generator 4123 (see FIG. 16) waits for the predetermined time and then sends a control signal to the logical AND unit 4125. As described above, the output of the condition group judging unit 4124 is "1", so that the logical AND unit 4125 outputs a control signal "1" to the control signal generator 4131 (in the packet outputting unit 413).

On receiving this control signal "1", the control signal generator 4131 sends a packet data read control signal to the packet obtaining unit 411. Since the storage address "00002400" is stored in the storage address register 4132 by filtering condition#2 and this address shows the write address for the buffer memory 34, the data in packet 3001 is written into the buffer memory 34 starting from the address "00002400".

In this way, the filtering unit 41 in the STB of the second embodiment of the present invention performs filtering wherein each of the transferred packets received by the packet obtaining unit 411 is subjected to a plurality of filtering conditions that can each contain different methods of comparison. Such filtering is both flexible and efficient.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A packet filtering apparatus for selectively outputting packets out of a plurality of inputted packets, the packet filtering apparatus comprising:

storage means for storing a plurality of conditions, each condition being specified by
  (1) a partial data position that indicates a position of a data part of a packet,
  (2) comparison data to which the data part is to be compared, and
  (3) a comparison criterion for comparing the data part and comparison data,
wherein different conditions include different comparison criteria;
selecting means for selecting one of the stored plurality of conditions; and
filtering means for comparing, based on the selected condition, the data part of one inputted packet with the comparison data according to the comparison criterion and for selectively allowing the packet to pass depending on a comparison result.

2. The packet filtering apparatus of claim 1, further comprising
updating means for updating, when the inputted packet does not satisfy the selected condition used by the filtering means, the selected condition to a different one of the stored plurality of conditions,
wherein the filtering means further compares, based on the updated condition, a data part of the inputted packet with the comparison data according to the comparison criterion and selectively allows the packet to pass depending on a comparison result for the updated condition.

3. The packet filtering apparatus of claim 1, further comprising
instructing means for instructing the filtering means as to which part of a predetermined memory should be used for storing data of a selectively passed packet, based on which condition was satisfied by the selectively passed packet.

4. The packet filtering apparatus of claim 1,
wherein the data part of a packet shows a position of the packet in an order assigned to the plurality of packets.

5. The packet filtering apparatus of claim 1,
wherein at least one of the stored plurality of conditions includes a comparison criterion relating to whether the data part and the comparison data are not equal, and the filtering means allows a packet to pass if the data part and the comparison data are not equal.

6. The packet filtering apparatus of claim 1,
wherein at least one of the stored plurality of conditions includes a comparison criterion relating to relative magnitudes of the data part and the comparison data, and the filtering means allows a packet to pass if the data part of the packet and the comparison data satisfy the comparison criterion relating to the relative magnitudes.

7. The packet filtering apparatus of claim 1,
wherein the packet is either of an MPEG (Moving Pictures Experts Group) transport stream packet and an MPEG packetized elementary stream packet.

8. A packet filtering apparatus for selectively outputting packets out of a plurality of inputted packets, the packet filtering apparatus comprising:

storage means for storing a plurality of type 2 conditions, each type 2 condition being composed of a plurality of type 1 conditions, each type 1 condition being specified by (1) a partial data position that indicates a position of a data part of a packet,
(2) comparison data to which the data part is to be compared, and
(3) a comparison criterion for comparing the data part and comparison data, and the type 2 conditions being composed such that the comparison criteria in the type 1 conditions differ, either between the type 1 conditions in a same type 2 condition or between the type 1 conditions in different type 2 conditions;

selecting means for selecting one type 2 condition out of the stored plurality of type 2 conditions: and filtering means for comparing, by applying each type 1 condition in the selected type 2 condition one at a time, the data part of one inputted packet with the comparison data according to the comparison criterion and for selectively allowing the packet to pass only if a comparison result "true" is given for every type 1 condition in the selected type 2 condition.

9. A set-top box including a packet filtering unit for selectively outputting packets out of a plurality of inputted packets, the packet filtering unit comprising:

storage means for storing a plurality of conditions, each condition being specified by
(1) a partial data position that indicates a position of a data part of a packet,
(2) comparison data to which the data part is to be compared, and
(3) a comparison criterion for comparing the data part and comparison data, wherein different conditions include different comparison criteria;

selecting means for selecting one of the stored plurality of conditions: and filtering means for comparing, based on the selected condition, the data part of one inputted packet with the comparison data according to the comparison criterion and for selectively allowing the packet to pass depending on a comparison result.

10. A set-top box including a packet filtering unit for selectively outputting packets out of a plurality of inputted packets, the packet filtering unit comprising:

storage means for storing a plurality of conditions, each condition being specified by
(1) a partial data position that indicates a position of a data part of a packet,
(2) comparison data to which the data part is to be compared, and
(3) a comparison criterion for comparing the data part and comparison data, wherein different conditions include different comparison criteria, one of the different comparison criteria being that the data part is not equal to the comparison data;

selecting means for selecting one of the stored plurality of conditions; and filtering means for comparing, based on the selected condition, the data part of one inputted packet with the comparison data according to the comparison criterion and for selectively allowing the packet to pass depending on a comparison result.

11. A set-top box including a packet filtering unit for selectively outputting packets out of a plurality of inputted packets, the packet filtering unit comprising:

storage means for storing a plurality of type 2 conditions, each type 2 condition being composed of a plurality of type 1 conditions, each type 1 condition being specified by (1) a partial data position that indicates a position of a data part of a packet,
(2) comparison data to which the data part is to be compared, and
(3) a comparison criterion for comparing the data part and comparison data, and the type 2 conditions being composed such that the comparison criteria in the type 1 conditions differ, either between the type 1 conditions in a same type 2 condition or between the type 1 conditions in different type 2 conditions;

selecting means for selecting one type 2 condition out of the stored plurality of type 2 conditions; and filtering means for comparing, by applying each type 1 condition in the selected type 2 condition one at a time, the data part of one inputted packet with the comparison data in the applied type 1 condition according to the comparison criterion in the applied type 1 condition and for selectively allowing the packet to pass only if a comparison result "true" is given for every type 1 condition in the selected type 2 condition.

12. A packet filtering method for selectively outputting packets out of a plurality of inputted packets, the packet filtering method comprising:

a storage step for storing a plurality of conditions, each condition being specified by
(1) a partial data position that indicates a position of a data part of a packet,
(2) comparison data to which the data part is to be compared, and
(3) a comparison criterion for comparing the data part and comparison data, wherein different conditions include different comparison criteria;

a selecting step for selecting one of the stored plurality of conditions; and a control step for comparing, based on the selected condition, the data part of one inputted packet with the comparison data according to the comparison criterion and for selectively allowing the packet to pass depending on a comparison result.

13. The packet filtering apparatus of claim 2,
wherein the packet is either of an MPEG (Moving Pictures Experts Group) transport stream packet and an MPEC packetized elementary stream packet.

14. The packet filtering apparatus of claim 3,
wherein the packet is either of an MPEG (Moving Pictures Experts Group) transport stream packet and an MPEC packetized elementary stream packet.

15. The packet filtering apparatus of claim 4,
wherein the packet is either of an MPEG (Moving Pictures Experts Group) transport stream packet and an MPEC packetized elementary stream packet.

16. The packet filtering apparatus of claim 5,
wherein the packet is either of an MPEG (Moving Pictures Experts Group) transport stream packet and an MPEC packetized elementary stream packet.

17. The packet filtering apparatus of claim 6,
wherein the packet is either of an MPEG (Moving Pictures Experts Group) transport stream packet and an MPEC packetized elementary stream packet.

\* \* \* \* \*